(12) United States Patent
Ohira et al.

(10) Patent No.: US 7,782,305 B2
(45) Date of Patent: Aug. 24, 2010

(54) PORTABLE UNIT

(75) Inventors: Kazuhiro Ohira, Kanagawa (JP);
Daisuke Kurihara, Tokyo (JP)

(73) Assignee: Sony Corporation, Tokyo (JP)

( * ) Notice: Subject to any disclaimer, the term of this patent is extended or adjusted under 35 U.S.C. 154(b) by 705 days.

(21) Appl. No.: 11/695,223

(22) Filed: Apr. 2, 2007

(65) Prior Publication Data

US 2007/0238340 A1 Oct. 11, 2007

(30) Foreign Application Priority Data

Apr. 7, 2006 (JP) .............................. 2006-106810

(51) Int. Cl.
G09G 5/00 (2006.01)
G09G 3/02 (2006.01)
(52) U.S. Cl. ...................... 345/169; 345/905; 455/575.1
(58) Field of Classification Search ................. 345/169, 345/905; D14/324; 455/575.1
See application file for complete search history.

(56) References Cited

U.S. PATENT DOCUMENTS

| | | | | |
|---|---|---|---|---|
| 6,721,545 B2* | 4/2004 | Doi | .......................... | 455/575.1 |
| 7,003,318 B2* | 2/2006 | Kota et al. | ................ | 455/575.1 |
| 7,010,331 B2* | 3/2006 | Johnson et al. | .......... | 455/575.1 |
| 7,457,650 B2* | 11/2008 | Iwai et al. | ................ | 455/575.1 |
| 7,606,598 B2* | 10/2009 | Kuhl et al. | ................. | 455/90.3 |
| 2005/0083642 A1* | 4/2005 | Senpuku et al. | ............. | 345/905 |
| 2006/0211385 A1* | 9/2006 | Kayzar et al. | ............ | 455/575.1 |

FOREIGN PATENT DOCUMENTS

JP 10-69897 3/1998

* cited by examiner

*Primary Examiner*—David L Lewis
(74) *Attorney, Agent, or Firm*—Oblon, Spivak, McClelland, Maier & Neustadt, L.L.P.

(57) ABSTRACT

A portable unit includes a housing, a display section arranged at a position of a principal face of the housing displaced to a housing first end side, an operation key arranged at a position of the principal face of the housing displaced to a housing second end side with respect to the display section arrangement position, and a frame element provided so as to project from the housing second end of the housing and cooperate with the housing second end to define a hole portion between the housing second end, the frame element having a gripping assisting function of being gripped together with the housing when the housing is gripped from a back face side of the housing for operation of the portable unit by a user thereby to assist gripping of the housing and a strap holding function of holding a strap threaded through the hole portion.

11 Claims, 22 Drawing Sheets

| REPRODUCTION ELAPSED TIME | DISPLAY CHARACTERS |
|---|---|
| [00:00] | Track 1 |
| [00:04] | Artist 1 |
| [00:08] | Words and music by Freddie Mermaid |
| [00:11] | Album 1 |
| [00:24] | I've paid money |
| [00:28] | Time after time |
| [00:33] | I've worked hard |
| [00:36] | But had no money |
| [00:41] | And bad incidents |
| [00:45] | I've made a few |
| [00:49] | I'm crying and crying at my home |
| [00:54] | But dreams come true |
| [00:57] | And I have to go on and go on |

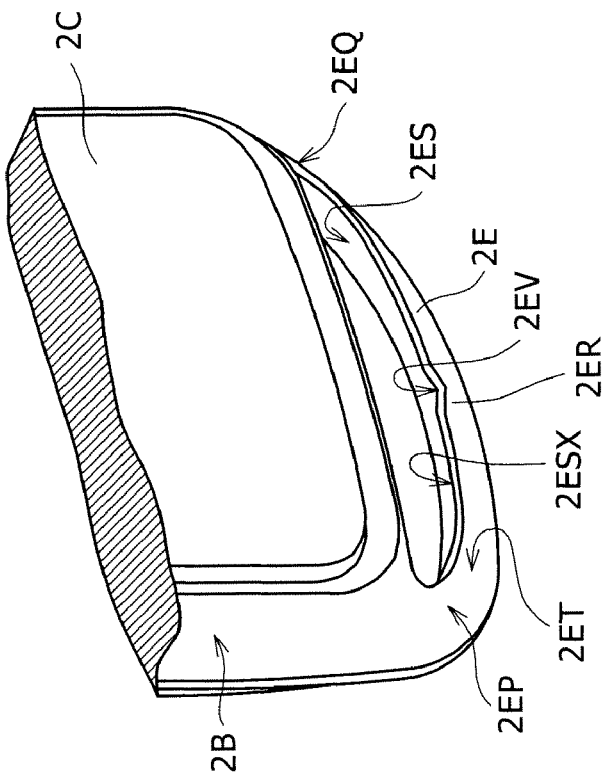
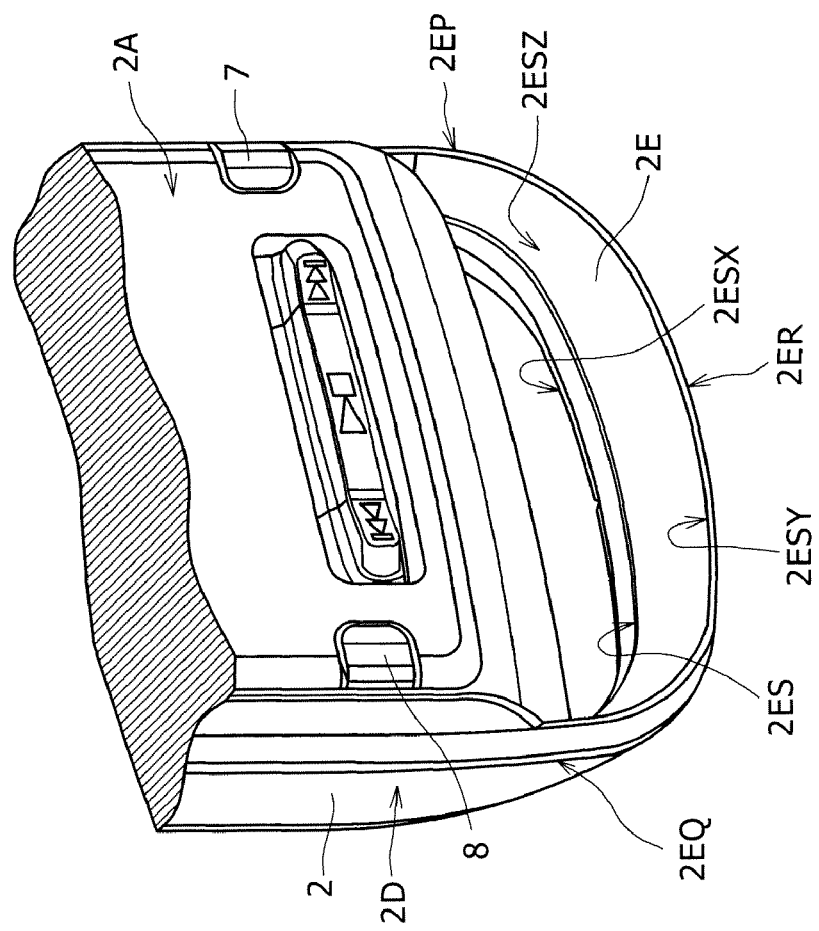

PORTABLE UNIT

CROSS REFERENCES TO RELATED APPLICATIONS

The present invention contains subject matter related to Japanese Patent Application JP 2006-106810 filed with the Japan Patent Office on Apr. 7, 2006, the entire contents of which being incorporated herein by reference.

BACKGROUND OF THE INVENTION

1. Field of the Invention

This invention relates to a terminal unit, and more particularly to a terminal unit suitable for application, for example, to a portable terminal unit which can reproduce a musical piece or an image.

2. Description of the Related Art

An electronic unit is known which includes a cabinet and a grip member in the form of an arcuate plate provided in a projecting manner at one end of the cabinet. The electronic unit can be carried by a person with the arcuate plate portion of the grip member thereof gripped. An electronic unit of the type described is disclosed, for example, in Japanese Patent Laid-Open No. Hei 10-69897 (page 2, FIG. 1).

SUMMARY OF THE INVENTION

Incidentally, it is estimated in recent years that, if an electronic unit of the type described is reduced in size, then it can be operated by the user while it is gripped, for example, at the cabinet thereof by one hand of the user and can be carried readily, resulting in enhancement of both of the operability and the portability. However, if the cabinet of an electronic unit is reduced in size, then depending upon the location of operation keys, it is sometimes difficult for the user to operate the electronic unit while the electronic unit is gripped stably at the cabinet thereof. Further, even if the cabinet of an electronic unit can be reduced in size, if also the grip member is reduced in size, then it becomes difficult to grip and carry the grip member. Therefore, existing electronic units have a problem in that, even if the size is reduced, both of the operability and the portability may not be enhanced readily.

Therefore, it is demanded to provide a portable unit which can be enhanced readily in operability and portability.

According to the present embodiment, there is provided a portable unit including a housing, a display section arranged at a position of a principal face of the housing displaced to a housing first end side, an operation key arranged at a position of the principal face of the housing displaced to a housing second end side with respect to the display section arrangement position, and a frame element provided so as to project from the housing second end of the housing and cooperate with the housing second end to define a hole portion therebetween, the frame element having a gripping assisting function of being gripped together with the housing when the housing is gripped from a back face side thereof for operation of the portable unit by a user thereby to assist gripping of the housing and a strap holding function of holding a strap threaded through the hole portion.

With the portable unit, by providing the single frame element on the housing, the user can operate the portable unit while the housing is gripped stably from the housing back face side together with the frame element. Further, the portable unit can be suspended on and carried by a hand, the neck or the like of the user using the strap whose apparatus attachment string is held by the frame element. Consequently, the portable unit can easily achieve enhancement of the operability and the portability with a simple configuration.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 33A and 33B are schematic perspective views showing a configuration of a frame element;

DETAILED DESCRIPTION OF THE PREFERRED EMBODIMENT

Figure 1A:
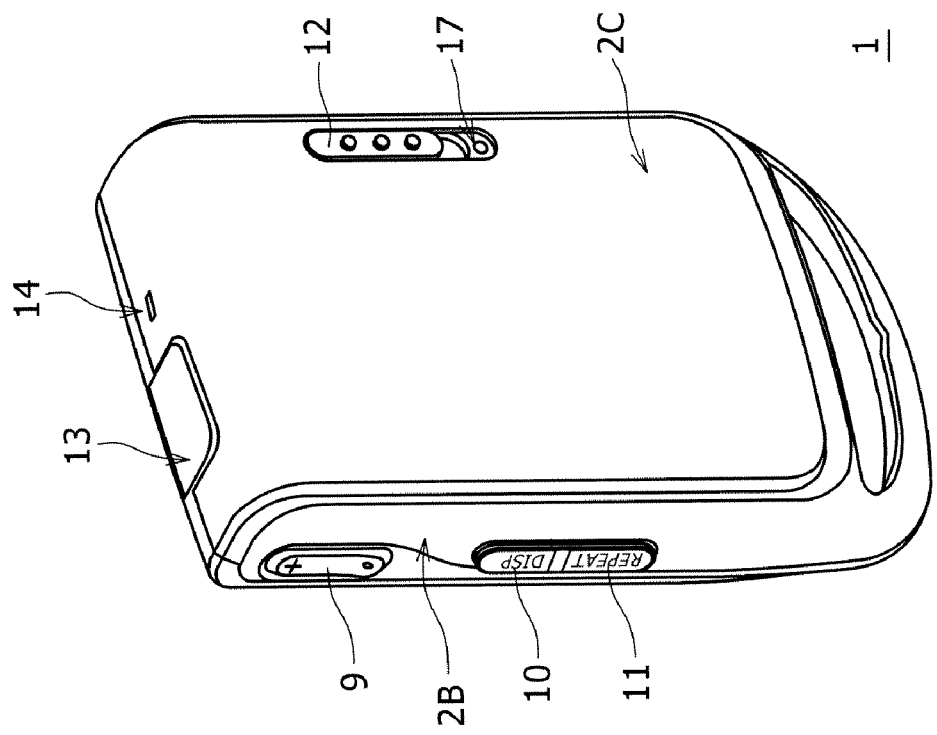
FIGS. 1A and 1B are schematic perspective views showing an appearance configuration of a portable terminal unit to which the present invention is applied.
Figure 1B:
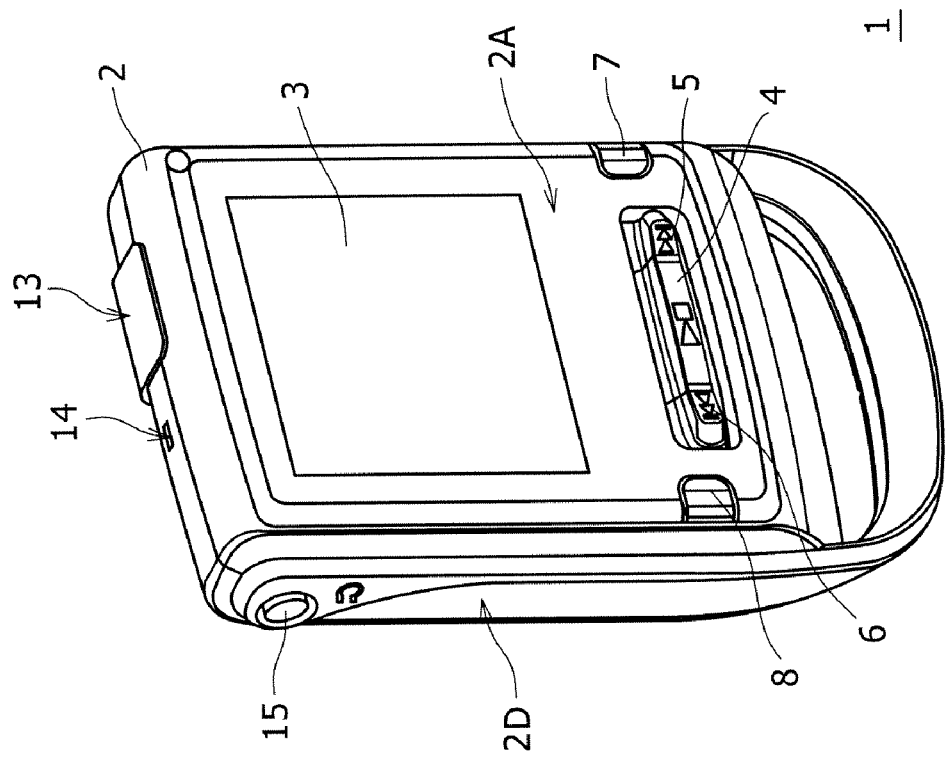

Referring first to FIGS. 1A and 1B, there is shown a portable terminal unit 1 to which the present invention is applied. The portable terminal unit 1 includes a housing 2 having a substantially flattened rectangular shape. The housing 2 has a front face (hereinafter referred to as housing principal face) 2A which is a principal portion upon operation thereof. A display section 3 is arranged at a position of the housing principal face 2A displaced to one end (hereinafter referred to as housing first end) side of the housing 2. The display section 3 may be a liquid crystal panel, an organic EL (Electro Luminescence) panel or some other suitable panel having a rectangular shape. Meanwhile, an operation key arrangement position is provided at a position of the housing principal face 2A on the other end (hereinafter referred to as housing second end) side of the housing 2 with respect to the display section arrangement position. It is to be noted that, in the following description, the housing first end side of the housing 2 is referred to as upper side, the housing second end side as lower side, and the right side and the left side of the housing 2 when the housing principal face 2A is viewed from the front side by a user are referred to as right side and left side, respectively.

An operation key (hereinafter referred to as three-directional operation key) 4 is arranged at a central location in the operation key arrangement region of the housing principal face 2A in a direction (hereinafter referred to as housing widthwise direction) substantially parallel to the housing principal face 2A and perpendicular to a particular direction (hereinafter referred to as housing lengthwise direction) from the housing first end to the housing second end of the housing 2. The three-directional operation key 4 allows three different operations in different directions including a depression operation of depressing the three-directional operation key 4 substantially perpendicularly to the housing principal face 2A and tilting operations of tilting the three-directional operation key 4 toward the housing first end side and the housing second end side. Two different operation keys (hereinafter referred to as right-side operation key 5 and left-side operation key 6) are arranged on the opposite sides of the three-directional operation key 4 in the operation key arrangement region of the housing principal face 2A such that the three keys are juxtaposed in a row along the housing widthwise direction. Further, an operation key (hereinafter referred to as menu display key) 7 for causing the display section 3 to display a menu screen is arranged on the right side with respect to the right-side operation key 5 in the operation key arrangement region of the housing principal face 2A. Meanwhile, another operation key (hereinafter referred to as option key) 8 for allowing selection of an additional function is arranged on the left side with respect to the left-side operation key 6 in the operation key arrangement region of the housing principal face 2A.

Three operation keys 9, 10 and 11 are arranged in a row along the housing lengthwise direction on one of the opposite side faces, that is, on a housing right-side face 2B, of the housing 2. The operation key 9 is provided for sound volume adjustment and is hereinafter referred to as sound volume adjustment key 9. the operation key 10 is provided for changing over the display screen to be displayed on the display section 3 and is hereinafter referred to as display changeover key 10. The operation key 11 is provided for allowing selection of a reproduction condition such as repetitive reproduction or random selection reproduction of musical pieces and is hereinafter referred to as reproduction condition selection key 11. Meanwhile, an operation key (hereinafter referred to as hold key) 12 slidably operable for disabling an operation of the operation keys is arranged on a rear face (hereinafter referred to as housing back face) 2C of the housing 2. Further, an external terminal 13 and a microphone 14 are provided at the housing first end of the housing 2. Incidentally, a cable terminal provided on a cable for the communication with an external distribution apparatus such as a personal computer which provides musical pieces and/or images can be connected to the external terminal 13. Furthermore, a jack 15 is provided on the housing first end side of the other side face (hereinafter referred to as housing left-side face) 2D of the housing 2. Both of a headphone plug and a cable plug provided on a cable for the communication with an external reproduction apparatus such as a music reproduction apparatus can be fitted into the jack 15. Incidentally, an operation key (hereinafter referred to as reset key) for restoring an initial state of various settings of the portable terminal unit 1 is provided on the housing second end side of the housing back face 2C with respect to the hold key 12. The operation key allows a depression operation thereof through a very small hole 17 perforated in the housing back face 2C.

Figure 2:
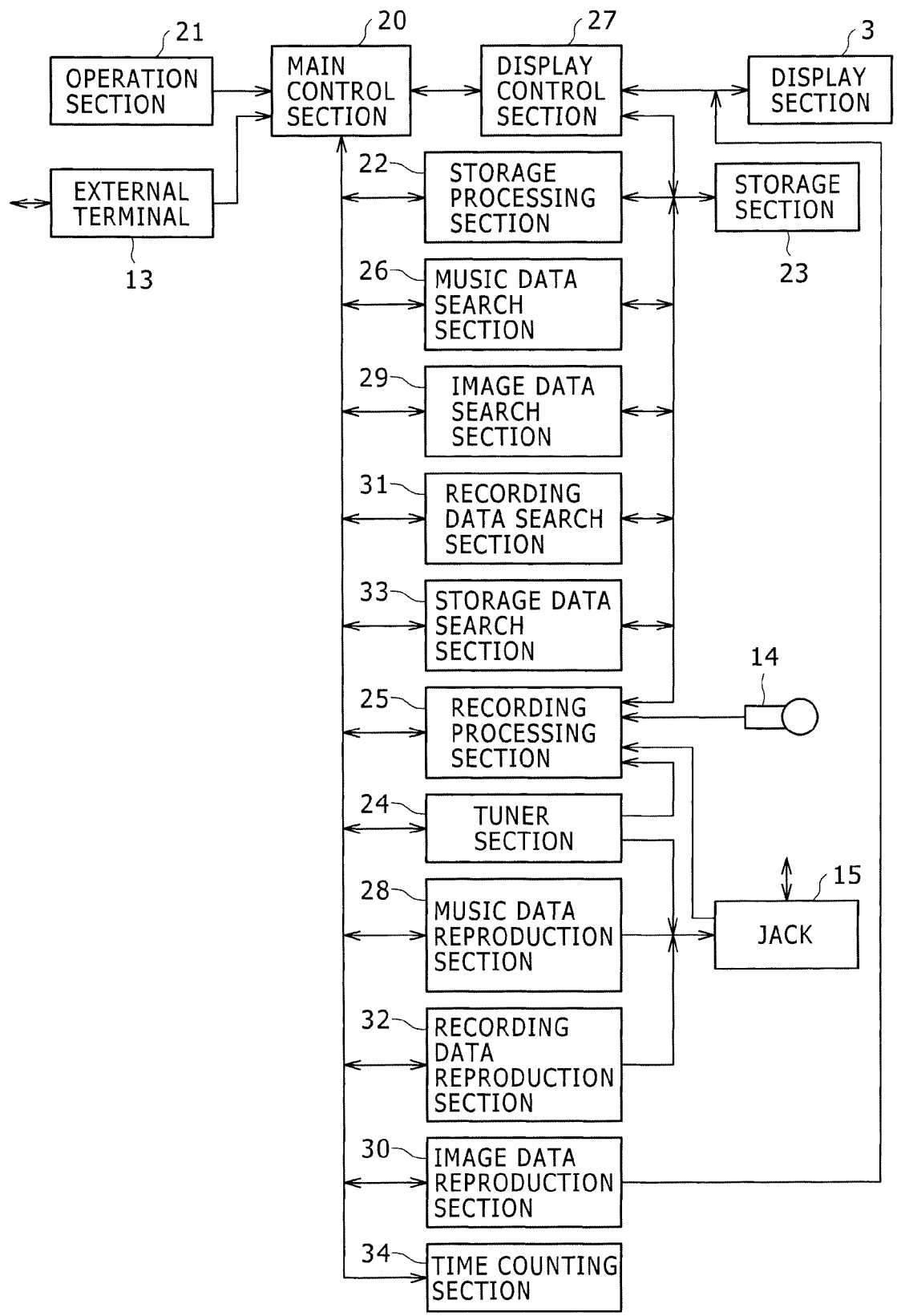
FIG. 2 is a block diagram showing a circuit configuration of the portable terminal unit.

Referring now to FIG. 2, the portable terminal unit 1 includes a main control section 20 which executes processes and controls processes of various circuits connected thereto in response to various commands provided thereto in response to operations of the operation keys by the user from an operation section 21 which includes the various operation keys described above. Further, if a notification of a result of a process is received in response to a situation of the process from some circuit is received, then the main control section 20 controls a process of another circuit based on the result of the process. The main control section 20 can thereby implement various functions such as a music reproduction function, an image reproduction function, a radio broadcast receiving function and a recording function of recording a musical piece (hereinafter referred to as transfer musical piece) reproduced by and transferred from a radio broadcasting station or an external reproduction apparatus or sound (hereinafter referred to as collected sound) collected through the microphone 14. In addition, if the main control section 20 establishes connection for communication to an external distribution apparatus (not shown) through the external terminal 13, then it functions as a peripheral apparatus to the external distribution apparatus. The main control section 20 thus controls, for example, processing of a storage processing section 22 under the control of the external distribution apparatus. Consequently, the main control section 20 can implement also a data storage function of storing music data (hereinafter referred to particularly as distribution music data) of a musical piece (hereinafter referred to as distribution musical piece) or image data (hereinafter referred to as distribution image data) of an image (hereinafter referred to as distribution image) of a photograph or the like distributed from an external distribution apparatus.

Actually, the external distribution apparatus retains distribution music data of distribution musical pieces as data files. Further, the external distribution apparatus retains distribution music related information in an associated relationship with the distribution music data. The distribution music related information may indicate the title (hereinafter referred to as distribution musical piece title) of the distribution musical piece, the title (hereinafter referred to as album title) of an album in which the distribution musical piece is collected, the name (hereinafter referred to as artist name) of an artist by whom the distribution musical piece is played, the name (hereinafter referred to as genre name) of a genre to which the distribution musical piece belongs, the data size of the distribution music data, the data format of the distribution music data and the file name (which may be produced using the distribution musical piece title) of the distribution music data. Further, the external distribution apparatus retains, for example, text data of the text of distribution musical pieces in an associated relationship with the distribution music data. Furthermore, the external distribution apparatus retains also distribution image data of distribution images as data files. Further, the external distribution apparatus retains distribution image related information indicative of the title (hereinafter referred to as distribution image title) of a distribution image, the data size of distribution image data, the data format of the distribution image data, the file name (which may be produced, for example, using the distribution image title) of the distribution image data and so forth in an associated relationship with each of the distribution image data.

If distribution music data is transmitted together with corresponding distribution music related information and text data from the external distribution apparatus, then the main control section 20 fetches the data through the external terminal 13. Then, the main control section 20 adds, for example, storage time information, which indicates the date and hour of the point of time at which the data is received, as storage time into the portable terminal unit 1 to the distribution music related information. Then, the main control section 20 signals the distribution music related information and text data to the storage processing section 22 together with the distribution music data. Further, if distribution image data is transmitted together with corresponding distribution image related information from the external distribution apparatus, then the main control section 20 fetches the transmitted data and information through the external terminal 13. Then, the main control section 20 adds storage time information also to the distribution image related information and signals the resulting distribution image related information together with the distribution image data to the storage processing section 22.

The portable terminal unit 1 has a storage section 23 built therein. A folder (hereinafter referred to as distribution music folder) for collectively managing a plurality of distribution music data is constructed in the storage section 23. Also a folder (hereinafter referred to as recording radio sound folder) for collectively managing a plurality of recording radio sound data obtained by recording radio broadcast programs is constructed in the storage section 23. Furthermore, a folder (hereinafter referred to as recording music folder) for collectively managing a plurality of music data (hereinafter referred to as recording music data) obtained by recording transfer musical pieces is constructed in the storage section 23. Further, a folder (hereinafter referred to as recording sound folder) for collectively managing a plurality of sound data (hereinafter referred to as recording sound data) obtained by recording collected sounds is constructed in the storage section 23.

If distribution music data is provided together with corresponding distribution music related information and text data from the main control section 20, then the storage processing section 22 stores the distribution music data together with the distribution music related information and text data in an associated relationship or without an associated relationship with the distribution music folder into the storage section 23 under the control of the main control section 20 in response to an instruction of the external distribution apparatus. Further, if distribution image data is provided together with corresponding distribution image related information from the main control section 20, then the storage processing section 22 stores the distribution image data together with the distribution image related information in an associated relationship or without an associated relationship with the distribution image folder into the storage section 23 under the control of the main control section 20 in response to an instruction of the external distribution apparatus.

A tuner section 24 searches, for example, for one or a plurality of broadcasting frequencies of different radio broadcasts and performs initialization so that the searched out broadcasting frequencies can be utilized for later reception of the radio broadcasts. In this state, if a desired broadcasting frequency is selected from among the initially set broadcasting frequencies by the user and a notification of the selected broadcasting frequency is received from the main control section 20, then the tuner section 24 extracts a radio broadcasting wave of the broadcasting frequency selected by the user from among radio broadcasting waves received through an antenna element (not shown) built in the housing 2. Then, the tuner section 24 performs a predetermined reception process for the radio broadcasting wave and performs, for example, a digital to analog conversion process for radio broadcasting data obtained by the reception process. Then, the tuner section 24 signals a radio broadcasting signal obtained by the digital to analog conversion process from the jack 15 to a headphone not shown. Consequently, the tuner section 24 can cause the headphone to output sound of the radio broadcast based on the radio broadcasting signal so that the user can enjoy the desired radio broadcast.

Further, if an instruction to start recording of the radio broadcast is issued by the user while the user enjoys the radio broadcast and a recording starting command of the radio broadcast is received from the main control section 20, then the tuner section 24 sends radio broadcast data produced at the point of time as it is for recording of the radio broadcast also to a recording processing section 25. Then, if an instruction to stop the recording of the radio broadcast is issued by the user and a recording stopping command of the radio broadcast is received from the main control section 20, then the tuner section 24 stops the signaling of the radio broadcast data to the recording processing section 25. In this manner, while an instruction to record a radio broadcast remains effective, the tuner section 24 can signal radio broadcast data of a radio broadcast of a recording object to the recording processing section 25.

Then, when radio broadcast data is supplied from the tuner section 24, the recording processing section 25 compression encodes the radio broadcast data in a predetermined format and signals recording radio data obtained by the compression encoding to the storage section 23. Consequently, the recording processing section 25 stores the recording radio data as a data file in an associated relationship with the recording radio folder into the storage section 23. Incidentally, when production of recording radio data is stopped, that is, when an instruction to stop recording of a radio broadcast is issued, the recording processing section 25 produces recording radio related information indicative of the data size of the recording radio data, the data format of the recording radio data, the file name (which may be determined, for example, arbitrarily) of the recording radio data and the recording time (for example, the date and hour of the point of time at which the production of the recording radio data is stopped) of the radio broadcast relating to the recording radio data. Then the recording processing section 25 signals also the recording radio related information to be storage section 23. Consequently, the recording processing section 25 stores the recording radio related information in an associated relationship with the recording radio data into the storage section 23. In this manner, while an instruction to record a radio broadcast remains effective, the recording processing section 25 can record the radio broadcast by storing radio data into the storage section 23.

On the other hand, if an instruction to start recording of a transfer musical piece reproduced by the external reproduction apparatus is issued and a recording starting command of the transfer musical piece is provided from the main control section 20, then the recording processing section 25 fetches the transfer music data reproduced by and transferred from the external reproduction apparatus through the jack 15. Thereupon, the recording processing section 25 compression encodes the transfer music data in a predetermined format and signals recording music data obtained by the compression encoding to the storage section 23. Consequently, the recording processing section 25 stores the recording music data as a data file in an associated relationship with the recording music folder into the storage section 23. If, in this state, an instruction to stop recording of the transferred music data is issued by the user and a recording stopping command of the transfer musical piece is provided from the main control section 20, then the recording processing section 25 stops the fetching of the transfer music data transferred from the external reproduction apparatus and stops also the production of the recording music data. As a result, the recording processing section 25 stops the storage of the recording music data. Then, when the production of the recording music data is stopped, that is, when an instruction to stop recording of the transfer musical piece is issued, the recording processing section 25 produces recording music related information. The recording music related information may include the data size of the recording music data, the data format of the recording music data, the file name (which may be determined, for example, arbitrarily) of the recording music data and the recording time (for example, the date and hour of the point of time at which the production of the recording music data is stopped) of the transfer music piece relating to the recording music data. Then the recording processing section 25 signals also the recording music related information to he storage section 23. Consequently, the recording processing section 25 stores the recording music related information in an associated relationship with the recording music data into the storage section 23. In this manner, while an instruction to record a transfer musical piece reproduced by the external reproduction apparatus remains effective, the recording processing section 25 can record the transfer musical piece by storing the recording music data into the storage section 23.

Further, if an instruction to start recording of collected sound is issued and a recording starting command of collected sound is provided from the main control section 20, then the recording processing section 25 fetches a sound signal of collected sound obtained by collecting sound of surroundings through the microphone 14. Thereupon, the recording processing section 25 performs an analog to digital conversion process of the sound signal and further performs compression encoding of the resulting signal in a predetermined format to produce recording sound data. Then, the recording processing section 25 signals the recording sound data to the storage section 23. Consequently, the recording processing section 25 stores the recording sound data as a data file in an associated relationship with the recording sound folder into the storage section 23. If, in this state, an instruction to stop the recording of the collected sound is issued from the user and a recording instruction command of collected sound is provided from the main control section 20, then the recording processing section 25 stops the collection of the sound by the microphone 14 and stops also the production of recording sound data. As a result, the recording processing section 25 stops the storage of the recording sound data. Then, when the production of the recording sound data is stopped, that is, when an instruction to stop the recording of the collected sound is issued, the recording processing section 25 produces recording sound related information indicative of the data size of the recording sound data, the data format of the recording sound data, the file name (which may be determined, for example, arbitrarily) of the recording sound data and the recording time (for example, the date and hour of the point of time at which the production of the recording sound data is stopped) of the collected sound relating to the recording sound data. Then, the recording processing section 25 signals the recording sound related information to the storage section 23. Consequently, the recording processing section 25 stores the recording sound related information in an associated relationship with the recording sound data into the storage section 23. In this manner, while an instruction to record collected sound remains effective, the recording processing section 25 can record collected sound by storing the recording sound data into the storage section 23. Incidentally, when the recording processing section 25 performs a recording process of radio broadcast data, transfer music data or a sound signal, it notifies a display control section 27 of recording elapsed time of the radio broadcast, transfer musical piece or collected sound through the main control section 20.

If a music data search section 26 receives a request to search for a file name of distribution music data from the main control section 20, then it searches the file name of all distribution music data from among various data such as distribution music data and distribution image data stored in the storage section 23. Then, the music data search section 26 distinguishes the searched out file names of all distribution music data between those of those distribution music data which are associated with the distribution music folder and those of those distribution music data which are not associated with the distribution music folder. Further, the music data search section 26 produces a list of the folder name set arbitrarily to the distribution music folder and file names of those distribution music data which are not associated with the distribution music folder. The music data search section 26 further produces a list of file names of those distribution music data which are associated with the distribution music folder. Then, the music data search section 26 produces a distribution music data list indicative of the lists. Then, the music data search section 26 signals the distribution music data list to the display control section 27 through the main control section 20.

If a file name of distribution music data is selected by the user based on the distribution music data list signaled to the display control section 27 and a request for distribution image related information is issued by the user, whereupon the selected file name is provided from the main control section 20 and a request for distribution music related information corresponding to distribution music data of the file name is provided, then the music data search section 26 searches for distribution music related information corresponding to the distribution music data of the selected file name from among a plurality of pieces of distribution music related information stored in the storage section 23. Then, the music data search section 26 reads out the searched out distribution music related information from the storage section 23 and signals the distribution music related information to the display control section 27 through the main control section 20. Further, if a plurality of text data stored in the storage section 23 include text data corresponding to the distribution music data of the selected file name, then the music data search section 26 searches out also the text data. Then, the music data search section 26 reads out the searched out text data from the storage section 23 and signals the text data to the display control section 27 through the main control section 20.

Figures 3, 4:
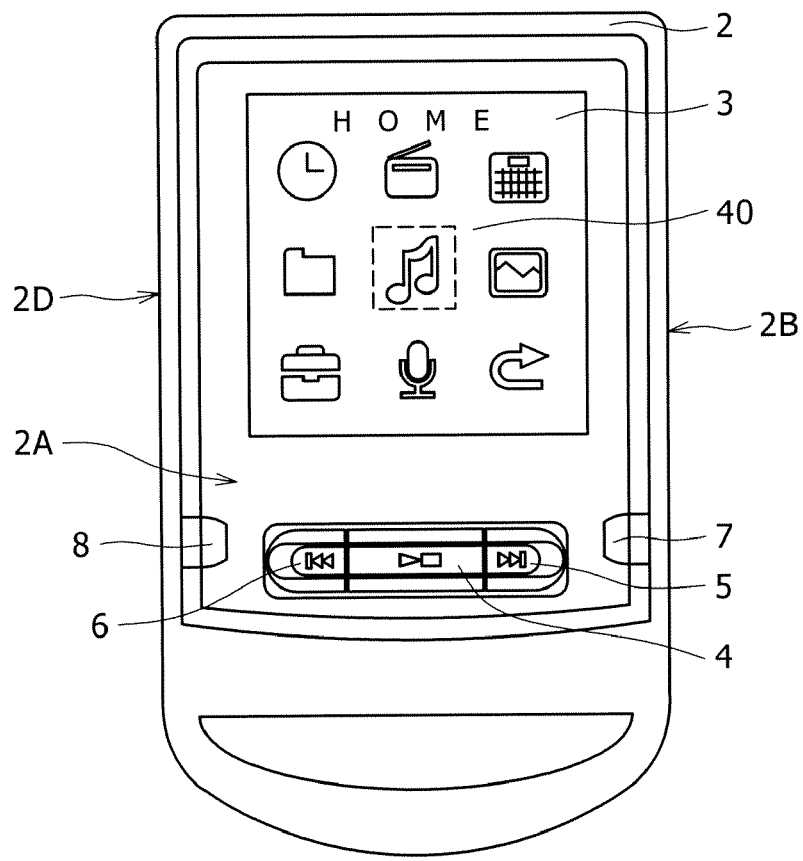
FIG. 3 is a view illustrating a configuration of text data.
FIG. 4 is a schematic view illustrating display of a display screen of a display section.

Referring to FIG. 3, the text data includes, for example, display characters indicative of a distribution musical piece title, display characters indicative of an artist name, and display characters of part of the text obtained by successively delimiting characters representative of the text for each predetermined frame from the top of the distribution musical piece. In the text data, time information representative of reproduction elapsed time for successively changing over the display of display characters in accordance with the progress of reproduction of the distribution musical piece is added to the display characters. For example, to display characters representative of a distribution musical piece title or display characters representative of an artist name in text data, time information indicative of reproduction elapsed time which is reproduction starting time of the distribution musical piece or reproduction elapsed time during reproduction of an introduction part is added. Meanwhile, to display characters for each predetermined frame in text data, time information representative of reproduction elapsed time when the top of each phrase begins to be reproduced is added. Accordingly, the music data search section 26 can notify the display control section 27 of display characters to be displayed in accordance with reproduction of the distribution musical piece depending upon the text data and a timing at which the display characters are to be displayed. In addition, if a file name of distribution music data to be deleted is selected by the user based on the distribution music data list signaled to the display control section 27 and a notification of the selected file name is issued from the main control section 20, then the music data search section 26 deletes the distribution music data of the selected file name from among a plurality of distribution music data stored in the storage section 23.

Then, if a file name of distribution music data of an object of reproduction is selected by the user based on the provided musical data list signaled to the display control section 27 and the selected file name is provided and a reproduction starting instruction is provided from the main control section 20, then a music data reproduction section 28 reads out corresponding distribution music data from the storage section 23 through the music data search section 26 based on the file name. Then, the music data reproduction section 28 performs a predetermined reproduction process including a decoding process and a digital to analog conversion process for the distribution music data to produce a distribution musical piece signal and signals the produced distribution music signal from the jack 15 to the headphone. Consequently, the music data reproduction section 28 can output a distribution musical piece based on the distribution music signal from the headphone so as to be enjoyed by the user. Incidentally, when the music data reproduction section 28 performs a reproduction process of the distribution music data, it notifies the display control section 27 of the reproduction elapsed time of the distribution musical piece through the main control section 20. Accordingly, the music data reproduction section 28 allows the display control section 27 to suitably change over the display of display characters included in the text data based on the reproduction elapsed time.

Further, if a image data search section 29 receives a request to search for a file name of distribution image data from the main control section 20, then it searches for the file name of all distribution image data from among various data such as distribution music data and distribution image data stored in the storage section 23. Then, the image data search section 29 distinguishes the searched out file names of all distribution image data between those of those distribution image data which are associated with the distribution image folder and those of those distribution image data which are not associated with the distribution image folder. Further, the image data search section 29 produces a list of the folder name set arbitrarily to the distribution image folder and file names of those distribution image data which are not associated with the distribution image folder. The image data search section 29 further produces a list of file names of those distribution image data associated with the distribution image folder. Then, the image data search section 29 produces a distribution image data list indicative of the lists. Then, the image data search section 29 signals the distribution image data list to the display control section 27 through the main control section 20.

If a file name of distribution image data is selected by the user based on the distribution image data list signaled to the display control section 27 and a request for distribution image related information is issued by the user, whereupon the selected file name is provided from the main control section 20 and a request for distribution image related information corresponding to distribution image data of the file name is provided, then the image data search section 29 searches for distribution image related information corresponding to the distribution image data of the selected file name from among a plurality of pieces of distribution image related information stored in the storage section 23. Then, the image data search section 29 reads out the searched out distribution image related information from the storage section 23 and signals the distribution image related information to the display control section 27 through the main control section 20. In addition, if a file name of distribution image data to be deleted is selected by the user based on the distribution image data list signaled to the display control section 27 and a notification of the selected file name is issued from the main control section 20, then the image data search section 29 deletes the distribution music data of the selected file name from among a plurality of distribution image data stored in the storage section 23.

Then, if a file name of distribution image data of an object of reproduction is selected by the user based on the provided musical data list signaled to the display control section 27 and the selected file name is provided and a reproduction starting instruction is provided from the main control section 20, then an image data reproduction section 30 reads out corresponding distribution image data from the storage section 23 through the image data search section 29 based on the file name. Then, the image data reproduction section 30 performs a predetermined reproduction process including a decoding process for the distribution image data and signals resulting data to the display section 3. Consequently, the image data reproduction section 30 allows the display section 3 to display a distribution image based on the distribution image data obtained by the reproduction process so as to be enjoyed by the user.

Further, if a demand to search for the file name of all of recording radio data, recording music data and recording sound data (hereinafter referred to collectively as recording data) stored in the storage section 23 is provided from the main control section 20, then a recording data search section 31 searches for the file name of all recording data stored in the storage section 23. Then, the recording data search section 31 produces a list of folder names set arbitrarily to the recording radio folder, distribution music folder and recording sound folder and produces lists of all searched out file names individually for file names of recording data associated with the recording radio folder, recording music data and recording sound folder. The recording data search section 31 further produces a recording data list representative of the lists. Then, the recording data search section 31 signals the provided recording data list to the display control section 27 through the main control section 20.

If a file name of recording data is selected by the user based on the provided recording data list signaled to the display control section 27 and a request for recording radio related information, recording music related information and recording sound related information (hereinafter referred to collectively as recording data related information) is issued by the user, whereupon the selected file name is provided from the main control section 20 and a request for recording data related information corresponding to recording data of the file name is provided, then the recording data search section 31 searches for recording data related information corresponding to the recording data of the selected file name from among a plurality of pieces of recording data related information stored in the storage section 23. Then, the recording data search section 31 reads out the searched out recording data related information from the storage section 23 and signals the recording data related information to the display control section 27 through the main control section 20.

Then, if a file name of recording data of an object of reproduction is selected by the user based on the recording data list signaled to the display control section 27 and the selected file name is provided and a reproduction starting instruction is provided from the main control section 20, then a recording data reproduction section 32 reads out corresponding recording data from the storage section 23 through the recording data search section 31 based on the file name. Then, the recording data reproduction section 32 performs a predetermined reproduction process including a decoding process and a digital to analog conversion process for the recording data to produce a recording signal and signals the produced recording signal from the jack 15 to the headphone. Consequently, the recording data reproduction section 32 can output a radio broadcast, a transfer musical piece or collected sound based on the recording signal from the headphone so as to be enjoyed by the user. Incidentally, when the recording data reproduction section 32 performs a reproduction process of the recording data, it notifies the display control section 27 of the reproduction elapsed time of the radio broadcast, transfer musical piece or collected sound through the main control section 20.

If a storage data search section 33 receives a request to search for the file name of all of distribution music data, distribution image data, recording radio data, recording music data and recording sound data (hereinafter referred to collectively as storage data) stored in the storage section 23 from the main control section 20, then it searches for the file name of all storage data stored in the storage section 23. Then, the storage data search section 33 distinguishes all of the searched out file names between those of the stored data which are associated with the distribution music folder, distribution image folder, recording radio folder, recording music folder and recording sound folder and those of those distribution music data and distribution image data which are not associated with the distribution music folder and the distribution image folder. Further, the storage data search section 33 produces a list of the folder names of the distribution music folder, distribution image folder, recording radio folder, recording music folder and recording sound folder and file names of those distribution music data and distribution image data which are not associated with the distribution music folder and the distribution image folder. The storage data search section 33 further produces lists the searched out file names individually for file names of recording data associated with the distribution music folder, distribution image folder, recording radio folder, recording music folder and recording sound folder. Then, the storage data search section 33 produces a storage data list indicative of the lists. Then, the storage data search section 33 signals the storage data list to the display control section 27 through the main control section 20.

If a file name of stored data is selected by the user based on the storage data list signaled to the display control section 27 and a request for distribution music related information, distribution image related information, recording radio related information, recording music related information and recording sound related information (hereinafter referred to collectively as storage data related information) corresponding to the storage data is issued by the user, whereupon the selected file name is provided from the main control section 20 and a request for the storage data related information corresponding to the storage data of the file name is provided, then the storage data search section 33 searches for storage data related information corresponding to the storage data of the selected file name from among a plurality of pieces of storage data related information stored in the storage section 23. Then, the storage data search section 33 reads out the searched out storage data related information from the storage section 23 and signals the storage data related information to the display control section 27 through the main control section 20. Incidentally, if a file name of stored data to be deleted is selected by the user based on the storage data list signaled to the display control section 27 and a notification of the selected file name is issued from the main control section 20, then the stored data of the selected file name is deleted from among a plurality of storage data stored in the storage section 23.

Furthermore, a time counting section 34 normally counts the date and hour at present and provides time information representative of the counted date and hour to various circuits including the main control section 20, recording processing section 25 and display control section 27. Consequently, the time counting section 34 allows the main control section 20 and the recording processing section 25 to detect, based on the time information, the date and hour of storage of each distribution music data and distribution image data and detect the date and hour of recording of a radio broadcast, a transfer musical piece and collected sound.

In addition, if any of the various operation keys is operated by the user, then the display control section 27 reads out corresponding display screen data such as menu screen data stored in advance in the storage section 23 and signals the read out display screen data to the display section 3. In this instance, the display control section 27 displays the display screen based on the display screen data such as a menu screen 40 on the display section 3 such that the upper side of the display screen is set to the housing first end side while the lower side of the display screen is set to the housing second end side. Actually, if the menu display key 7 is operated so as to be depressed by the user, then the display control section 27 reads out menu screen data stored in advance in the storage section 23 and signals the menu screen data to the display section 3. Consequently, the display control section 27 causes the display section 3 to display such a menu screen 40 as shown in FIG. 5 based on the menu screen data.

Figure 5:
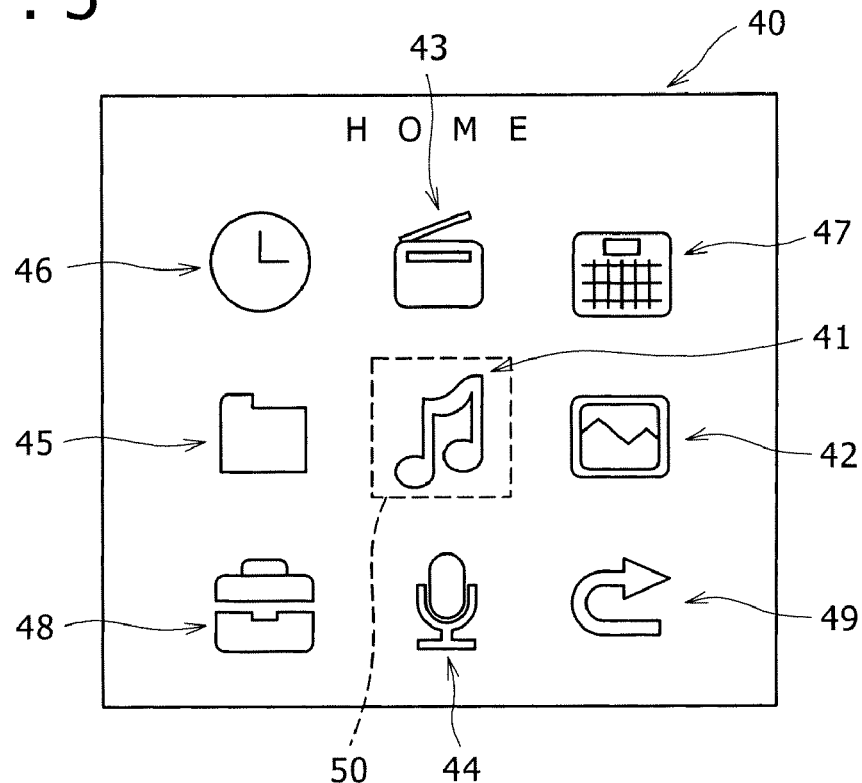
FIG. 5 is a schematic view showing a configuration of a menu screen.

Referring to FIG. 5, the menu screen 40 shown includes, for example, nine display elements (hereinafter referred to as icons) arranged in an array of three rows and three columns and indicating various functions which can be implemented by the portable terminal unit 1 as selection items. Actually, the icons include a music reproduction selection icon 41 for selecting a music reproduction function, an image display section icon 42 for selecting an image display function, a radio broadcast selection icon 43 for selecting a radio broadcast listening function, and a recording selection icon 44 for selecting a recording function. The icons further include a table display selection icon 45 for selecting a table display function of stored data, a time display selection icon 46 for selecting a time display function, a calendar display selection icon 47 for selecting a calendar displaying function, and a setting selection function 48 for selecting a setting function. The icons still further include a screen changeover selection function 49 for selecting a screen changeover function so that the display screen to be displayed on the display section 3 is returned to the display screen immediately preceding to the present display screen. The icons are arranged on the menu screen 40 such that the rows thereof extend in parallel to the housing widthwise direction and the columns thereof extend in parallel to the housing lengthwise direction. Incidentally, each icon is formed in a design pattern representative of a corresponding function as a selection item.

Also an indicator (hereinafter referred to as cursor) 50 for selecting one of the music reproduction selection icon 41, image display section icon 42, radio broadcast selection icon 43, recording selection icon 44, table display selection icon 45, time display selection icon 46, calendar display selection icon 47, setting selection function 48 and screen changeover selection function 49 (hereinafter referred to collectively as function selection icons) is displayed in a superposed relationship on one of the function selection items on the menu screen 40. It is to be noted that the cursor 50 is apparently transparent but sets, for example, the luminance of the design pattern of the function selection icon on which the cursor 50 is superposed to a higher luminance than that of the design patterns of the other function selection icons so as to indicate that the one function selection icon is selected.

If the three-directional operation key 4 is operated so as to be tilted to the housing first end side by the user while the menu screen 40 is displayed on the display section 3, then the display control section 27 recognizes that an instruction to shift the cursor 50 by one selection item distance toward the housing first end side is issued. Thus, the display control section 27 causes the cursor 50 to move by one function selection item distance toward the housing first end side in parallel to the housing lengthwise direction on the menu screen 40. Consequently, when the three-directional operation key 4 is operated so as to be tilted toward the housing first end side, the display control section 27 changes over the function selection icon, whose luminance is to be set to the higher level, to a next function selection icon on the housing first end side along the housing lengthwise direction. On the other hand, if the three-directional operation key 4 is operated so as to be tilted toward the housing second end side by the user, then the display control section 27 recognizes that an instruction to shift the cursor 50 by one selection item distance toward the housing second end side is issued. Thus, the display control section 27 causes the cursor 50 to move by one function selection item distance toward the housing second end side in parallel to the housing lengthwise direction on the menu screen 40. Consequently, when the three-directional operation key 4 is operated so as to be tilted toward the housing second end side, the display control section 27 changes over the function selection icon, whose luminance is to be set to the higher level, to a next function selection icon on the housing second end side along the housing lengthwise direction.

Further, if the right-side operation key 5 is operated so as to be depressed by the user, then the display control section 27 recognizes that an instruction to shift the cursor 50 by one selection item distance toward the right side, that is, toward the housing right-side face 2B side, is issued. Thus, the display control section 27 causes the cursor 50 to move by one function selection item distance toward the housing right-side face 2B side in parallel to the housing widthwise direction on the menu screen 40. Consequently, when the right-side operation key 5 is operated so as to be depressed, the display control section 27 changes over the function selection icon, whose luminance is to be set to the higher level, to a next function selection icon on the housing right-side face 2B side along the housing widthwise direction. On the other hand, if the left-side operation key 6 is operated so as to be depressed by the user, then the display control section 27 recognizes that an instruction to shift the cursor 50 by one selection item distance toward the left side, that is, toward the housing left-side face 2D side is issued. Thus, the display control section 27 causes the cursor 50 to move by one function selection item distance toward the housing left-side face 2D side in parallel to the housing widthwise direction on the menu screen 40. Consequently, when the left-side operation key 6 is operated so as to be depressed, the display control section 27 changes over the function selection icon, whose luminance is to be set to the higher level, to a next function selection icon on the housing left-side face 2D side along the housing widthwise direction. In this manner, the display control section 27 can move the cursor 50 on the menu screen 40 to arbitrarily select one of the function selection items in response to an operation of any of the three-directional operation key 4, right-side operation key 5 and left-side operation key 6 by the user. Further, the display control section 27 can set the luminance of the selected function selection icon higher than that of the other function selection icons so as to allow the selected function selection icon to be recognized precisely by the user.

If the three-directional operation key 4 is operated so as to be depressed by the user while, for example, the music reproduction selection icon 41 is selected with the cursor 50 superposed thereon on the menu screen 40 displayed on the display section 3, then the display control section 27 recognizes that the selection of the music reproduction selection icon 41 is definitely decided. Thus, the display control section 27 acquires the distribution music data list described hereinabove from the music data search section 26 through the main control section 20. Further, the display control section 27 reads out musical piece list presentation screen data stored in advance in the storage section 23. Then, the display control section 27 synthesizes the presentation music data list with the musical piece list presentation screen data and signals resulting synthetic display screen data to the display section 3. Consequently, the display control section 27 causes the display section 3 to display such a musical piece list presentation screen 55 as shown in FIG. 6 based on the synthetic display screen data in place of the menu screen 40.

Figure 6:
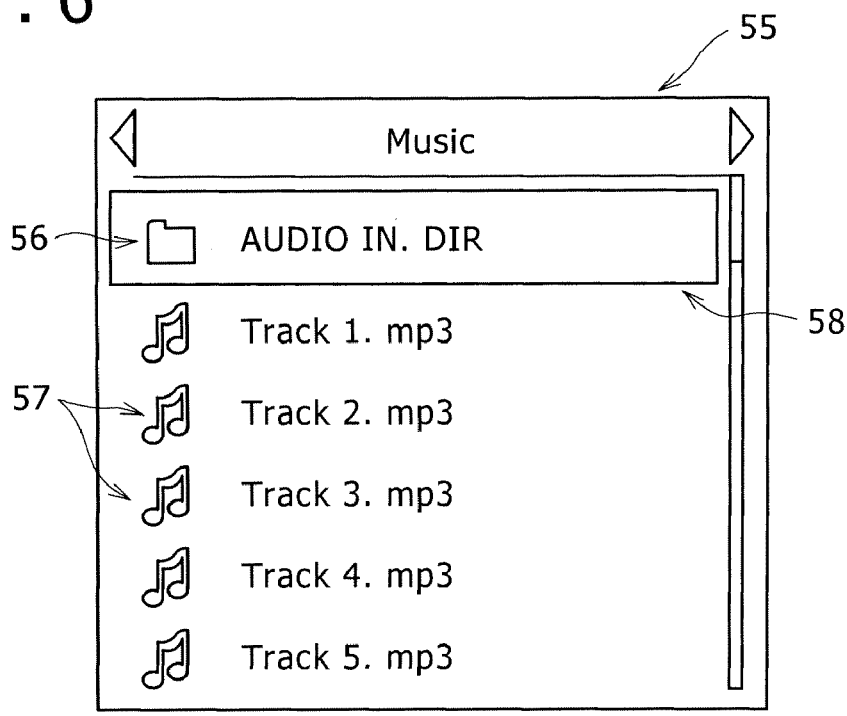
FIG. 6 is a view illustrating a configuration of a musical piece list presentation screen.

Referring to FIG. 6, the musical piece list presentation screen 55 includes display of a list in which, as selection items, a folder name 56 of the distribution music folder and file names 57 of distribution music data which are not associated with the distribution music folder are arranged in order from the housing first end side toward the housing second end side along the housing lengthwise direction. Also an icon 58 for selecting one of the folder name 56 and the file names 57 displayed in the list is displayed in a superposed relationship on the folder name 56 or one of the file names 57 on the musical piece list presentation screen 55. Incidentally, the icon 58 displays the characters of the folder name 56 or one of the file names 57 on which the icon 58 is superposed in a reversed fashion with respect to the characters of the other ones of the folder name 56 and the file names 57 so as to indicate that the folder name 56 or the one of the file names 57 is selected.

If the three-directional operation key 4 is operated so as to be tilted toward the housing first end side by the user while the musical piece list presentation screen 55 is displayed on the display section 3 in this manner, then the display control section 27 recognizes that an instruction to shift the icon 58 by one selection item distance toward the housing first end side is issued. Thus, the display control section 27 causes the icon 58 to move by one function selection item distance toward the housing first end side in parallel to the housing lengthwise direction on the musical piece list presentation screen 55. Consequently, when the three-directional operation key 4 is operated so as to be tilted toward the housing first end side, the display control section 27 changes over the folder name 56 or the file name 57, whose characters are to be reversed, to a next function selection icon on the housing first end side along the housing lengthwise direction. On the other hand, if the three-directional operation key 4 is operated so as to be tilted toward the housing second end side by the user, then the display control section 27 recognizes that an instruction to shift the icon 58 by one selection item distance toward the housing second end side is issued. Thus, the display control section 27 causes the icon 58 to move by one function selection item distance toward the housing second end side in parallel to the housing lengthwise direction on the musical piece list presentation screen 55. Consequently, when the three-directional operation key 4 is operated so as to be tilted toward the housing second end side, the display control section 27 changes over the folder name 56 or the file name 57, whose characters are to be reversed, to a next function selection icon on the housing second end side along the housing lengthwise direction.

Further, if the three-directional operation key 4 is operated so as to be tilted toward the housing second end side by the user while the icon 58 is superposed on the file name 57 displayed at the other end of the screen on the musical piece list presentation screen 55, then the display control section 27 scrolls, that is, moves, the entire list display of the folder name 56 and the file names 57 toward the housing first end side by one selection item distance of the folder name 56 and the file names 57 in parallel to the housing lengthwise direction while the icon 58 is stopped on the musical piece list presentation screen 55. Consequently, the file name 57 allows the user to visually observe any of the file names 57, which may not be displayed fully on the musical piece list presentation screen 55 at a time, on the musical piece list presentation screen 55.

Further, if the three-directional operation key 4 is operated so as to be tilted toward the housing first end side by the user while the icon 58 is superposed on the file name 57 displayed at the one end of the musical piece list presentation screen 55 on the screen, then the display control section 27 scrolls the entire list display of the folder name 56 and the file names 57 toward the housing second end side by one selection item distance of the folder name 56 and the file names 57 in parallel to the housing lengthwise direction while the icon 58 is stopped on the musical piece list presentation screen 55. Consequently, the file name 57 allows the user to visually observe any of the folder name 56 and the file names 57, which may not be displayed fully on the musical piece list presentation screen 55 at a time, on the musical piece list presentation screen 55. In this manner, the display control section 27 allows the icon 58 to be superposed arbitrarily on one of the folder name 56 and the file names 57 on the musical piece list presentation screen 55 so as to be selected in response to a tilting operation of the three-directional operation key 4 by the user. Further, the display control section 27 can cause the characters of the selected folder name 56 or file name 57 to be displayed reversely with respect to the characters of the other ones of the folder name 56 and the file names 57 so as to notify the user of the selection precisely.

Incidentally, if the three-directional operation key 4 is operated so as to be depressed or the right-side operation key 5 is operated so as to be depressed while the folder name 56 is selected, that is, the icon 58 is superposed on the folder name 56, on the musical piece list presentation screen 55 displayed on the display section 3, then the display control section 27 recognizes that the selection of the folder name 56 is definitely decided. Thus, the display control section 27 updates the display substance of the musical piece list presentation screen 55. In this instance, the display control section 27 causes the display section 3 to display a musical piece list presentation screen (hereinafter referred to as substance updated list presentation screen) not shown having the updated display substance such that only the file names of distribution music data associated with the distribution music folder are juxtaposed in order along the housing lengthwise direction from the housing first end side toward the housing second end side so as to form a list and also the cursor is displayed in a superposed relationship. Then, also where the substance changed list presentation screen is displayed on the display section 3, the display control section 27 allows the cursor to be moved on the substance change list presentation screen to arbitrarily select one file name in response to a tilting operation of the three-directional operation key 4 by the user similarly as described hereinabove. It is to be noted that, for example, if the left-side operation key 6 is operated so as to be depressed by the user while the substance change list presentation screen is displayed on the display section 3, then the display control section 27 recognizes that an instruction to restore the last display screen is issued. Thus, the display control section 27 controls the display section 3 to display the musical piece list presentation screen 55 in place of the substance change list presentation screen.

If the three-directional operation key 4 is operated so as to be depressed by the user while one of the file names 57 is displayed on the display section 3, that is, the cursor 58 is superposed on the file name 57, on the musical piece list presentation screen 55 or the substance change list presentation screen displayed on the display section 3, then the display control section 27 recognizes that the selection of the file name 57 is decided definitely. Then, the display control section 27 notifies the music data reproduction section 28 of the file name (hereinafter referred to as selection decision file name) 57 whose selection is decided definitely as the file name of the distribution music data to be reproduced through the main control section 20. Further, the display control section 27 acquires distribution music related information corresponding to the distribution music data of the selection decision file name 57 from the music data search section 26 through the main control section 20. It is to be noted, however, that, if text data is associated with the distribution music data of the selection decision file name 57, then the display control section 27 acquires also the text data. Further, the display control section 27 acquires also time information indicative of the reproduction elapsed time of the distribution musical piece (hereinafter referred to as selection decision musical piece) based on the distribution music data of the selection decision file name 57 from the music data reproduction section 28 through the main control section 20.

Figure 7:
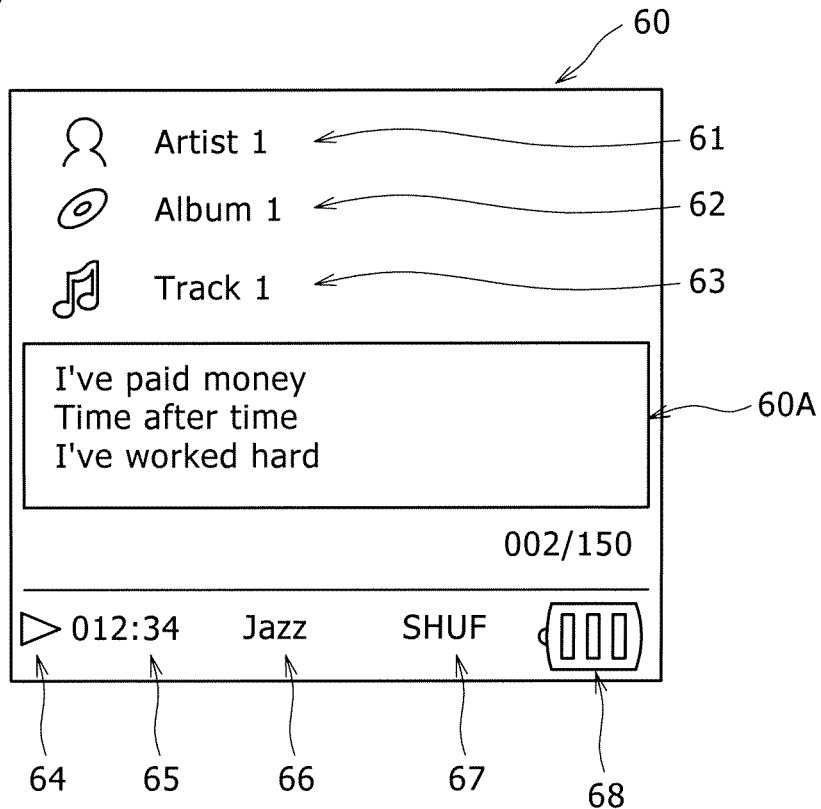
FIG. 7 is a schematic view showing a configuration of a music reproduction screen.

Then, the display control section 27 reads out music reproduction screen data stored in advance in the storage section 23. Thereupon, the display control section 27 synthesizes the distribution music related information and the text data with the music reproduction screen data and signals resulting synthetic display screen data to the display section 3. Consequently, the display control section 27 causes the display section 3 to display such a music reproduction screen 60 as shown in FIG. 7 based on the synthetic display screen data. Referring to FIG. 7, the music reproduction screen 60 includes, on the housing first end side thereof, an artist name 61, an album title 62 and a distribution music title 63 relating to the distribution music data of the selection decision file name 57. Further, the music reproduction screen 60 includes, at a central portion thereof, display of a text display region 60A, in which a distribution musical piece title, an artist name and display characters representative of part of the text for each phrase, which are obtained based on the text data, are successively changed over and displayed in response to the reproduction elapsed time of the selection decision musical piece. The music reproduction screen 60 further includes, on the housing second end side thereof, display of a state notification icon 64 for indication of a state such as reproduction, pause or stop, reproduction elapsed time 65, a genre name 66 of a genre to which the selection decision musical piece belongs, a reproduction condition 67 selected in response to a depression operation of the reproduction condition selection key 11, and a remaining amount notification icon 68 representative of the remaining capacity of the battery. Accordingly, the display control section 27 can cause the display section 3 to display such a music reproduction screen 60 as described above to notify the user of various kinds of information relating to the selection decision musical piece.

Incidentally, if one of the file names 57 is selected on the musical piece list presentation screen 55 or the substance change list presentation screen described above and the selection is decided definitely, then although the display control section 27 controls the display section 3 to display the music reproduction screen 60, since reproduction of the selection decision musical piece is started at this point of time, the display control section 27 controls the display section 3 to display the state notification icon 64 for the notification that the selection decision musical piece is being reproduced. Further, if the three-directional operation key 4 is depressed for a shorter period of time than a predetermined period of time selected in advance during reproduction of the selection decision musical piece, then the display control section 27 temporarily stops the reproduction of the selection decision musical piece. However, if the three-directional operation key 4 is depressed again for the shorter period of time, then the reproduction is re-started. In response to such operations, the state notification icon 64 displayed on the music reproduction screen 60 is changed over to that which indicates a pause or to that which indicates that reproduction is proceeding. Further, if the three-directional operation key 4 is depressed for more than the predetermined time while the selection decision musical piece is in a reproduction state or a pause state, then the display control section 27 stops the reproduction of the selection decision musical piece. In response to this, the state notification icon 64 displayed on the music reproduction screen 60 is changed over to that which indicates the stop of reproduction.

Figure 8:
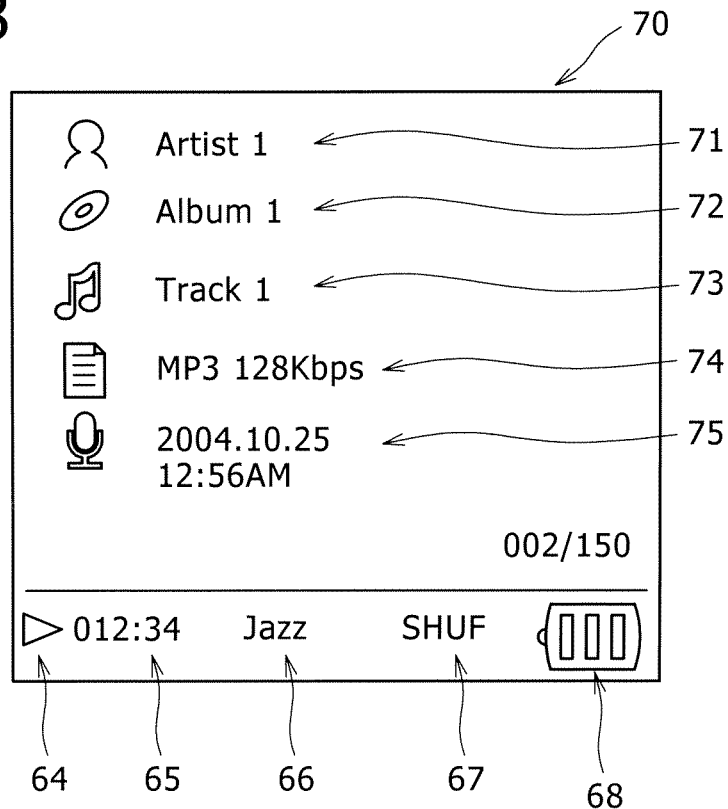
FIG. 8 is a schematic view showing a configuration of a music information presentation screen.

Incidentally, if the display changeover key 10 is operated so as to be depressed while the music reproduction screen 60 is displayed on the display section 3, then the display control section 27 reads out music information presentation screen data stored in advance in the storage section 23. Then, the display control section 27 synthesizes the distribution music related information with the music information presentation screen data and signals resulting synthetic display screen data to the display section 3. Consequently, the display control section 27 causes the display section 3 to display such a music information presentation screen 70 as shown in FIG. 8 based on the synthetic display screen data in place of the music reproduction screen 60. The music information presentation screen 70 displays an artist name 71, an album title 72, a distribution musical piece title 73, a data format 74 and a storage time 75 relating to the distribution music data of the file name 57 and juxtaposed along the housing lengthwise direction from the housing first end side toward the housing second end side. Further, a state notification icon 64, a reproduction elapsed time 65, a genre name 66, a reproduction condition 67 and a remaining amount notification icon 68 are displayed on the housing second end side of the music information presentation screen 70 similarly as in the case of the music reproduction screen 60. Accordingly, the display control section 27 can cause the display section 3 to display the music information presentation screen 70 to particularly notify the user of the substance of the distribution music related information relating to the distribution music data of the file name 57.

Figure 9:
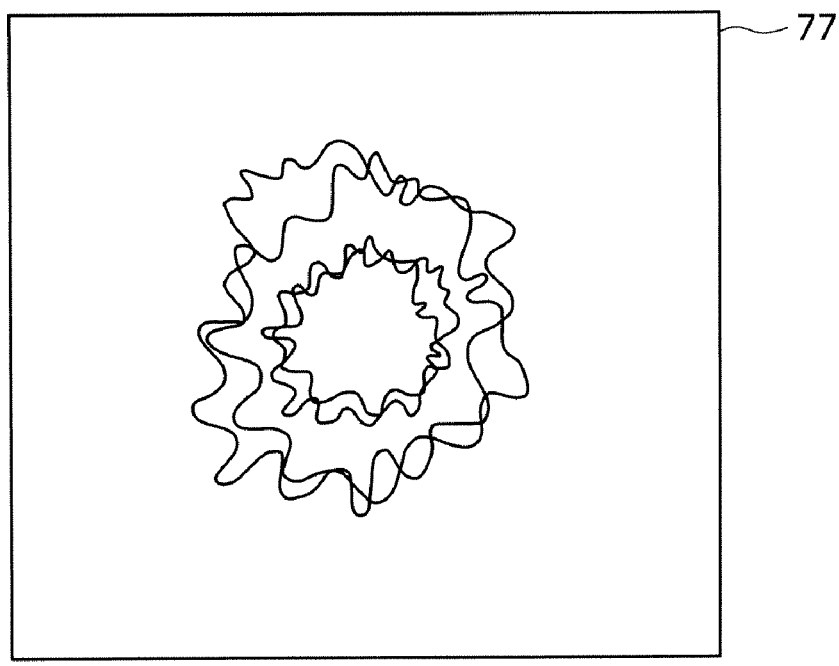
FIGS. 9, 10 and 11 are schematic views showing different configurations of an animation image.
Figure 10:
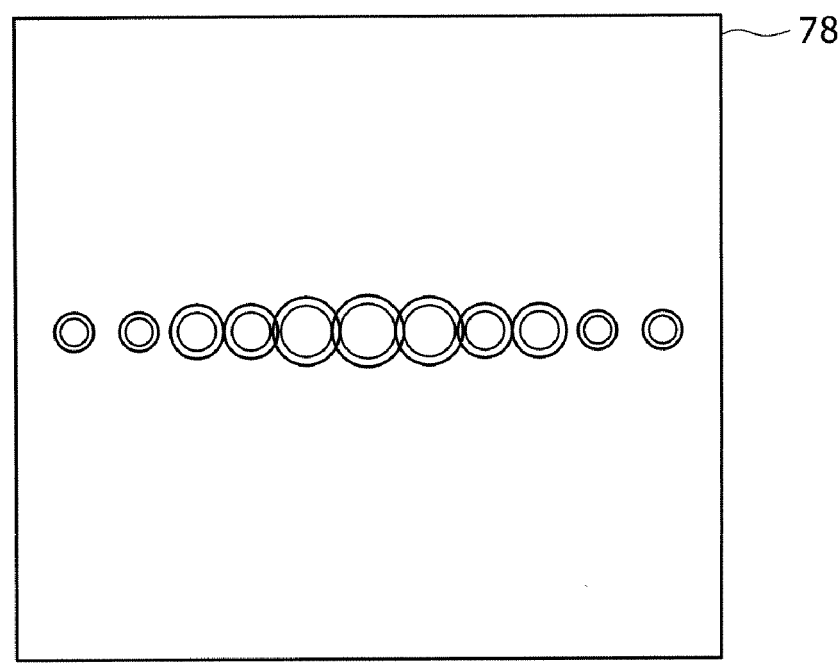
Figure 11:
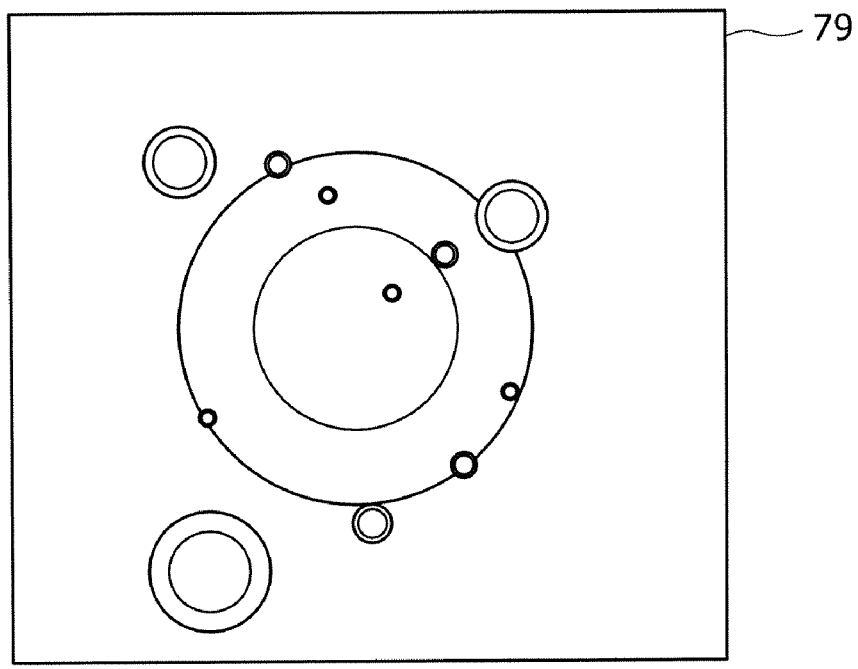

On the other hand, if the display changeover key 10 is depressed again while the music information presentation screen 70 is displayed on the display section 3, then the display control section 27 reads out, from among animation image data of such three different animation images 77 to 79 as shown in FIGS. 9 to 11 which are stored in advance in the storage section 23, animation image data of one of the animation images 77, 78 and 79 selected arbitrarily by the user. Then, the display control section 27 signals the read out animation image data to the display section 3 so that the display section 3 displays the animation image 77, 78 or 79 based on the animation image data in place of the music information presentation screen 70. In this instance, the display substance of each of the animation images 77 to 79 is changed in accordance with the progress of reproduction of the distribution musical piece. Accordingly, if the display control section 27 causes the display section 3 to display one of the animation images 77 to 79 in accordance with a request of the user, also the displayed one of the animation images 77 to 79 whose display substance varies in accordance with the reproduction thereof can be enjoyed together with the selection decision musical piece by the user.

Incidentally, if the reproduction of the selection decision musical piece is temporarily stopped or the reproduction is stopped while one of the animation images 77 to 79 is displayed on the display section 3, then the display control section 27 stops also the change of the display substance of any of the animation images 77 to 79. Accordingly, if one of the animation images 77 to 79 is displayed during reproduction of the selection decision musical piece, then when the reproduction is temporarily stopped or is stopped, the display control section 27 can notify the user of such temporary stopping or stopping also by the stopping of the change of the animation images 77 to 79. Incidentally, if the display changeover key 10 is depressed while one of the animation images 77 to 79 is displayed on the display section 3, then the display control section 27 causes the display section 3 to display the music reproduction screen 60 in place of the animation images 77 to 79. In this manner, when a distribution musical piece of an object of reproduction is selected, every time the display changeover key 10 is depressed, the display control section 27 causes the display section 3 to change over the screen to be displayed circulatorily and successively among the music reproduction screen 60, music information presentation screen 70 and animation images 77 to 79.

On the other hand, if the right-side operation key 5 is depressed while the music reproduction screen 60 or the music information presentation screen 70 is displayed on the display section 3, then the display control section 27 recognizes that the distribution music data to be reproduced is to be changed over to the immediately succeeding distribution music data, that is, selection of the succeeding musical piece is to be performed, in accordance with the distribution music data list. Thus, the display control section 27 performs a process similar to that described above while setting the file name of the immediately succeeding distribution music data as a selection decision file name. Consequently, the display control section 27 changes the display substance of the music reproduction screen 60 or the music information presentation screen 70 displayed on the display section 3 in accordance with the immediately succeeding distribution music data. On the other hand, if the left-side operation key 6 is depressed while the music reproduction screen 60 or the music information presentation screen 70 is displayed on the display section 3, then the display control section 27 recognizes that the distribution music data to be reproduced is to be changed over to the immediately preceding distribution music data, that is, selection of the last musical piece is to be performed, in accordance with the distribution music data list. Thus, also in this instance, the display control section 27 performs a process similar to that described hereinabove while setting the file name of the immediately preceding distribution music data as a selection decision file name. Consequently, the display control section 27 changes the display substance of the music reproduction screen 60 or the music information presentation screen 70 displayed on the display section 3 in accordance with the immediately preceding distribution music data. Incidentally, if the right-side operation key 5 is depressed during reproduction of a selection decision musical piece, then although a musical piece changing instruction can be inputted as described above, if the right-side operation key 5 is kept depressed, then a fast feeding instruction for fast feeding the reproduction of the selection decision musical piece is inputted thereby. Further, if the left-side operation key 6 is depressed during reproduction of a selection decision musical piece, then although a musical piece changing back instruction can be inputted as described above, if the left-side operation key 6 is kept depressed, then a reverse feeding instruction for reverse feeding the reproduction of the selection decision musical piece is inputted thereby.

Figure 12:
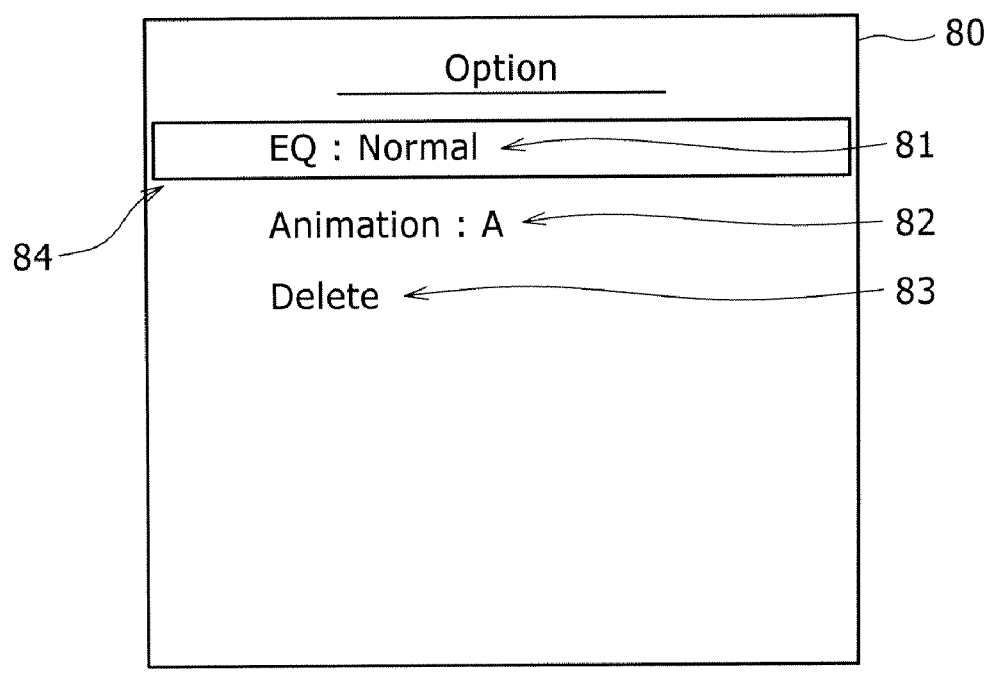
FIG. 12 is a schematic view showing a configuration of a music option screen.

Incidentally, if the display changeover key 10 is depressed while the music reproduction screen 60, music information presentation screen 70 or one of the animation images 77 to 79 is displayed on the display section 3, then the display control section 27 recognizes that an instruction to display an option screen for a distribution musical piece is issued. Thus, the display control section 27 reads out music option screen data stored in advance in the storage section 23. Then, the display control section 27 signals the music option screen data to the display section 3 so that the display section 3 displays such a music option screen 80 as shown in FIG. 12 based on the music option screen data. Referring to FIG. 8, the music option screen 80 includes display of a list of a sound quality choice 81 for sound quality setting, an animation setting choice 82 for animation image setting and a deletion choice 83 for deletion of the distribution musical piece of a file name 57 juxtaposed as selection items along the housing lengthwise direction from the housing first end side toward the housing second end side. Also a cursor 84 for selecting one of the sound quality choice 81, animation setting choice 82 and deletion choice 83 displayed in a list is displayed in a superposed relationship on the sound quality choice 81, animation setting choice 82 or deletion choice 83 on the music option screen 80. The cursor 84 has a reverse display function similar to that of the icon 58 described hereinabove.

If the three-directional operation key 4 is operated so as to be tilted toward the housing first end side or the housing second end side while the music option screen 80 is displayed on the display section 3, then the display control section 27 shifts the cursor 84 by one selection item distance toward the housing first end side or the housing second end side on the music option screen 80 in response to the tilting operation. Then, if the three-directional operation key 4 is depressed by the user while, for example, the sound quality choice 81 is selected, that is, the cursor 84 is supposed on the sound quality choice 81, on the music option screen 80, then the display control section 27 recognizes that the selection of the sound quality choice 81 is decided definitely. As a result, the display control section 27 reads out sound quality setting screen data stored in advance in the storage section 23 and signals the read out data to the display section 3. Consequently, the display control section 27 causes the display section 3 to display such a sound quality setting screen 85 as shown in FIG. 13 based on the sound quality setting screen data in place of the music option screen 80.

Figure 13:
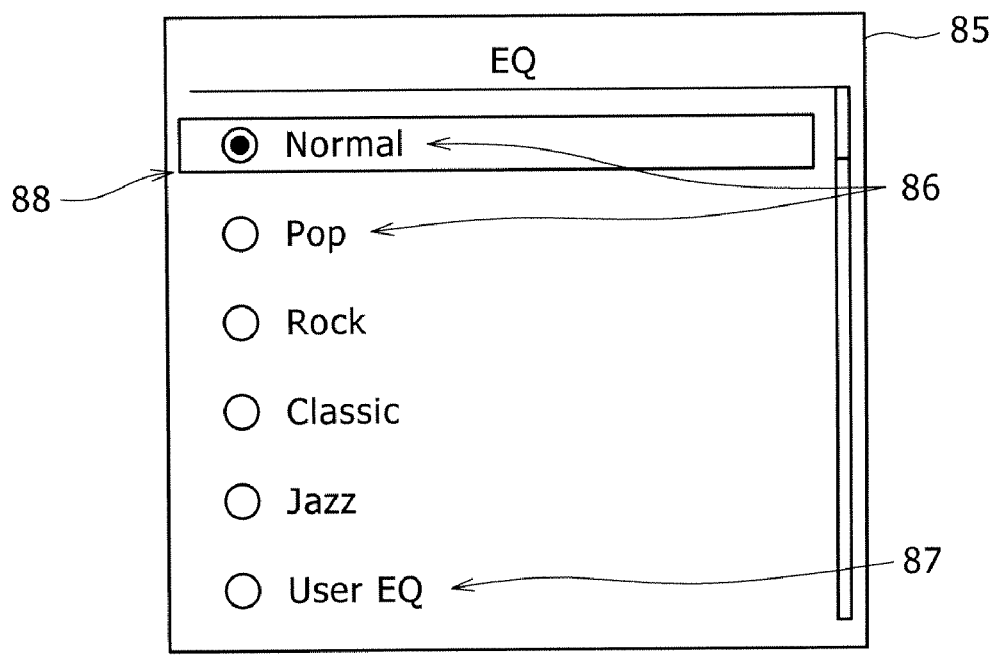
FIG. 13 is a schematic view showing a configuration of a sound quality setting screen.

Referring to FIG. 13, the sound quality setting screen 85 includes display of a list in which, as selection items, sound quality choices 86 each for selecting one of a standard sound quality set in advance for sound quality setting or sound qualities by genres set in advance for individual genres of music and a sound quality adjustment choice 87 for allowing the user to adjust the sound quality arbitrarily are juxtaposed along the housing lengthwise direction from the housing first end side toward the housing second end side. Also a cursor 88 is displayed in a superposed relationship on one of the sound quality choices 86 and the sound quality adjustment choice 87 on the sound quality setting screen 85 similarly as in the case of the music option screen 80. If the three-directional operation key 4 is operated so as to be tilted toward the housing first end side or the housing second end side while the sound quality setting screen 85 is displayed on the display section 3, then the display control section 27 shifts the cursor 88 by one selection item distance toward the housing first end side or the housing second end side on the sound quality setting screen 85 in response to the tilting operation of the three-directional operation key 4. Then, if the three-directional operation key 4 is operated so as to be depressed by the user while one of the sound quality choices 86 is selected on the sound quality setting screen 85, that is, the cursor 88 is superposed on one of the sound quality choices 86, then the display control section 27 recognizes that the selection of the sound quality choice 86 is decided definitely. As a result, the display control section 27 sets the sound quality of the selection decision musical piece to the standard sound quality or the genre-based sound quality corresponding to the sound quality choice 86 whose selection is decided definitely. After this setting, the display control section 27 causes the display section 3 to display the music option screen 80 in place of the sound quality setting screen 85.

Figure 14:
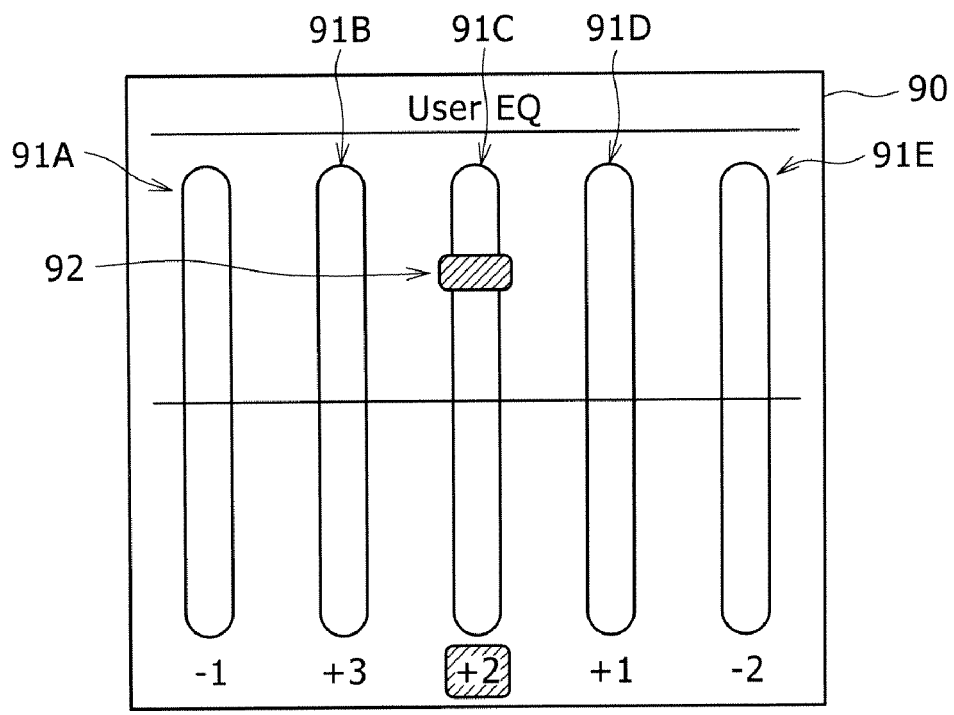
FIG. 14 is a schematic view showing a configuration of a sound quality adjustment screen.

On the other hand, if the three-directional operation key 4 is operated so as to be depressed by the user while the sound quality adjustment choice 87 is selected on the sound quality setting screen 85, that is, the cursor 88 is superposed on the sound quality adjustment choice 87, then the display control section 27 recognizes that the selection of the sound quality adjustment choice 87 is decided definitely. In this instance, the display control section 27 reads out sound quality adjustment screen data stored in advance in the storage section 23 and signals the read out data to the display section 3. Consequently, the display control section 27 causes the display section 3 to display such a sound quality adjustment screen 90 as shown in FIG. 14 based on the sound quality adjustment screen data in place of the sound quality setting screen 85. Referring to FIG. 14, elongated adjustment bars 91A to 91E for sound quality adjustment for individual predetermined frequency bands are displayed in parallel to the housing lengthwise direction on the sound quality adjustment screen 90. Also a cursor 92 for selecting a frequency band to be adjusted from among the frequency bands of the adjustment bars 91A to 91E is displayed on the sound quality adjustment screen 90. The cursor 92 is displayed in a superposed relationship on one of the adjustment bars 91A to 91E and represented as an adjustment knob for adjusting the sound quality. Further, a plurality of graduations are set to each of the adjustment bars 91A to 91E, for example, along the housing lengthwise direction. Thus, the cursor 92 can be used also to select one of the graduations by moving along any of the adjustment bars 91A to 91E one by one graduation gradually toward the housing first end side or the housing second end side. Further, the value of a graduation selected by means of the cursor 92 on any of the adjustment bars 91A to 91E is displayed in a corresponding relationship to the adjustment bar on the housing second end side on the sound quality adjustment screen 90.

If the right-side operation key 5 is operated so as to be depressed while the sound quality adjustment screen 90 is displayed on the display section 3, then the display control section 27 recognized that an instruction to move the cursor 92 toward the right side, that is, toward the housing right-side face 2B side, is issued. Thus, the display control section 27 shifts the cursor 92 to the right side one of the adjustment bars 91A to 91E. On the other hand, if the left-side operation key 6 is operated so as to be depressed by the user, then the display control section 27 recognizes that an instruction to move the cursor 92 toward the left side, that is, toward the housing left-side face 2D side, is issued. Thus, the display control section 27 shifts the cursor 92 to the left side one of the adjustment bars 91A to 91E. Further, if the three-directional operation key 4 is operated so as to be tilted toward the housing first end side while the cursor 92 is positioned on one of the adjustment bars 91A to 91E, then the display control section 27 recognizes that an instruction to shift the cursor 92 toward the housing first end side along the housing lengthwise direction is issued. Thus, the display control section 27 moves the cursor 92 by one graduation distance toward the housing first end side on that one of the adjustment bars 91A to 91E on which the cursor 92 is positioned. Further, if the three-directional operation key 4 is operated so as to be tilted toward the housing second end side while the cursor 92 is positioned on one of the adjustment bars 91A to 91E, then the display control section 27 recognizes that an instruction to shift the cursor 92 toward the housing second end side along the housing lengthwise direction is issued. Thus, the display control section 27 moves the cursor 92 by one graduation distance toward the housing second end side on that one of the adjustment bars 91A to 91E on which the cursor 92 is positioned. In this manner, the display control section 27 moves the cursor 92 for each of the adjustment bars 91A to 91E to select one of the graduations.

Then, if the three-directional operation key 4 is operated so as to be depressed by the user while the sound quality adjustment screen 90 is displayed on the display section 3, then the display control section 27 recognizes that the adjustment of the sound quality is completed. Thus, the display control section 27 sets the sound quality of the selection decision musical piece in response to the values of the graduations selected on the adjustment bars 91A to 91E by the point of time. Further, the display control section 27 causes the display section 3 to display the music option screen 80 in place of the sound quality adjustment screen 90. In this manner, the display control section 27 allows the user to set the sound quality. After the sound quality is set in this manner, the display control section 27 reflects the setting also as setting of the sound quality of any other distribution musical piece or transfer musical piece.

On the other hand, if the three-directional operation key 4 is operated so as to be depressed by the user while the music option screen 80 is displayed on the display section 3 and, for example, the animation setting choice 82 is selected, that is, the cursor 84 is superposed on the animation setting choice 82, then the display control section 27 recognizes that the selection of the animation setting choice 82 is decided definitely. As a result, the display control section 27 reads out animation setting screen data stored in advance in the storage data search section 33 and signals the read out data to the display section 3. Consequently, the display control section 27 causes the display section 3 to display such an animation setting screen 95 as shown in FIG. 15 based on the animation setting screen data in place of the music option screen 80.

Figure 15:
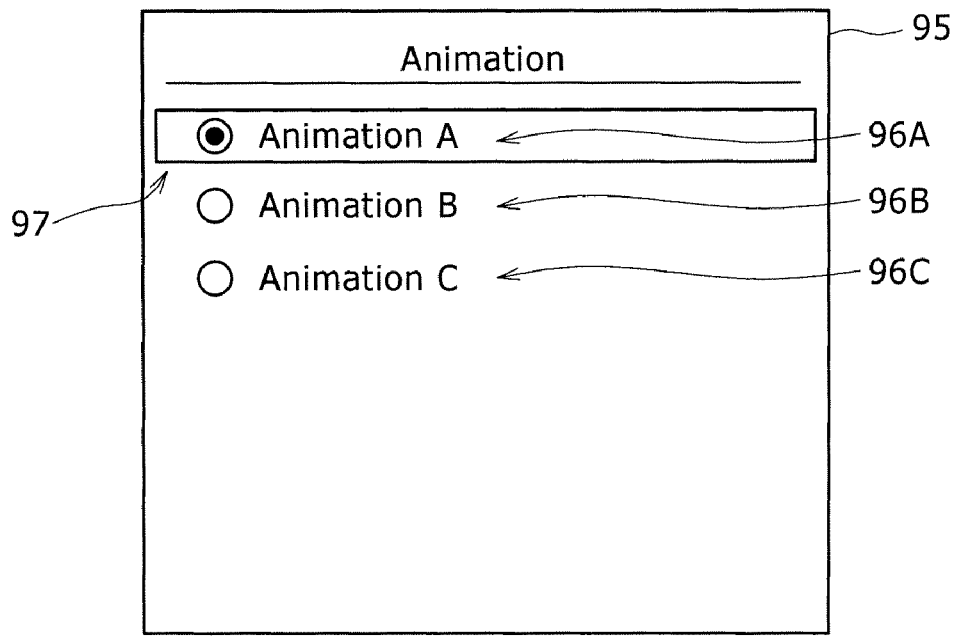
FIG. 15 is a schematic view showing a configuration of an animation setting screen.

Referring to FIG. 15, the animation setting screen 95 includes display of a list in which, as selection items, animation choices 96A to 96C for arbitrarily selecting the three animation images 77 to 79 described hereinabove are juxtaposed along the housing lengthwise direction from the housing first end side toward the housing second end side. Also a cursor 97 is displayed in a superposed relationship on one of the animation choices 96A to 96C on the animation setting screen 95 similarly as in the case of the music option screen 80. If the three-directional operation key 4 is operated so as to be tilted toward the housing first end side or the housing second end side while the animation setting screen 95 is displayed on the display section 3, then the display control section 27 shifts the cursor 97 by one selection item distance toward the housing first end side or the housing second end side on the animation setting screen 95 in response to the tilting operation. Then, if the three-directional operation key 4 is operated so as to be depressed by the user while one of the animation choices 96A to 96C is selected on the animation setting screen 95, that is, the cursor 97 is superposed on one of the animation choices 96A to 96C, then the display control section 27 recognizes that the selection of that one of the animation choices 96A to 96C is decided definitely. As a result, the display control section 27 causes the display section 3 to display that one of the animation images 77 to 79 which corresponds to that one of the animation choices 96A to 96C whose selection is decided definitely in response to a depression operation of the display changeover key 10.

Incidentally, if the three-directional operation key 4 is operated so as to be depressed by the user while, for example, the image display section icon 42 is selected on the menu screen 40 displayed on the display section 3, that is, the cursor 50 is superposed on the image display section icon 42, then the display control section 27 recognizes that the selection of the image display section icon 42 is decided definitely. Thus, the display control section 27 acquires the distribution image data list described hereinabove from the image data search section 29 through the main control section 20. Further, the display control section 27 reads out image list presentation screen data stored in advance in the storage section 23. Then, the display control section 27 synthesizes the distribution image data list with the image list presentation screen data and signals resulting synthetic display screen data to the display section 3. Consequently, the display control section 27 causes the display section 3 to display such an image list presentation screen 100 as shown in FIG. 16 based on the synthetic display screen data in place of the menu screen 40.

Figure 16:
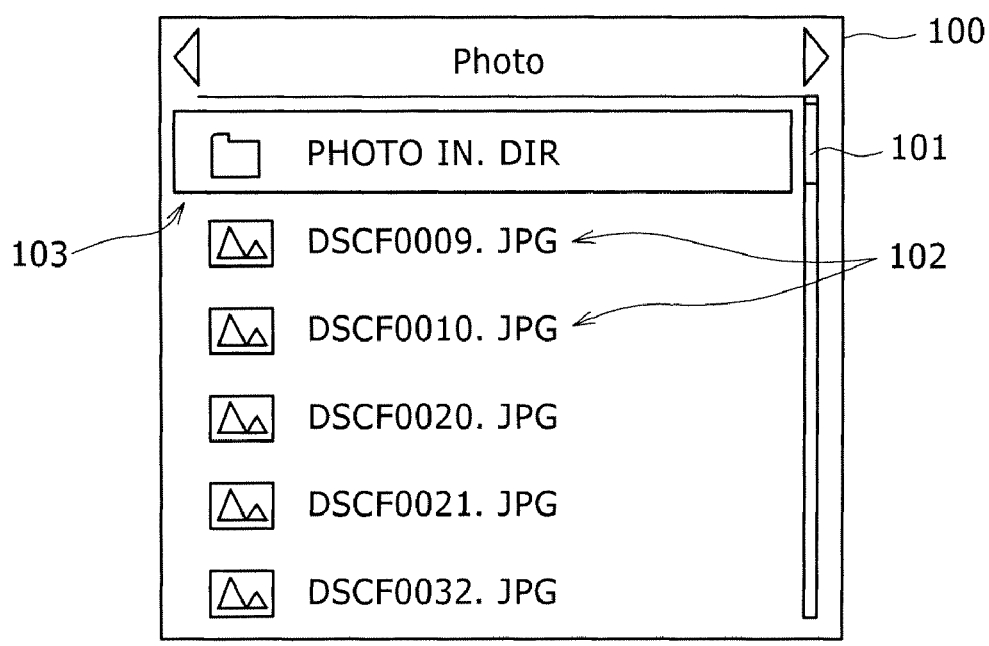
FIG. 16 is a schematic view showing a configuration of an image list presentation screen.

Referring to FIG. 16, the image list presentation screen 100 includes display of a list in which, as selection items, a folder name 101 of the distribution image folder and file names 102 of distribution image data which are not associated with the distribution image folder are arranged in order from the housing first end side toward the housing second end side along the housing lengthwise direction. Also a cursor 103 similar to that on the musical piece list presentation screen 55 is displayed in a superposed relationship on one of the folder name 101 and the file names 102 on the image list presentation screen 100. Then, if the three-directional operation key 4 is operated so as to be tilted toward the housing first end side or the housing second end side by the user while the image list presentation screen 100 is displayed on the display section 3 in this manner, then the display control section 27 shifts the cursor 103 similarly as in the case of the musical piece list presentation screen 55 described hereinabove so that one of the file names 102 is selected. On the other hand, when the display control section 27 causes the image list presentation screen 100 to be displayed on the display section 3, it causes the folder name 101 and the file names 102 displayed in a list to be scrolled similarly as in the case wherein the musical piece list presentation screen 55 is displayed. Then, when the selection of the folder name 101 is decided definitely, the display control section 27 updates the display substance of the image list presentation screen 100.

Figure 17:
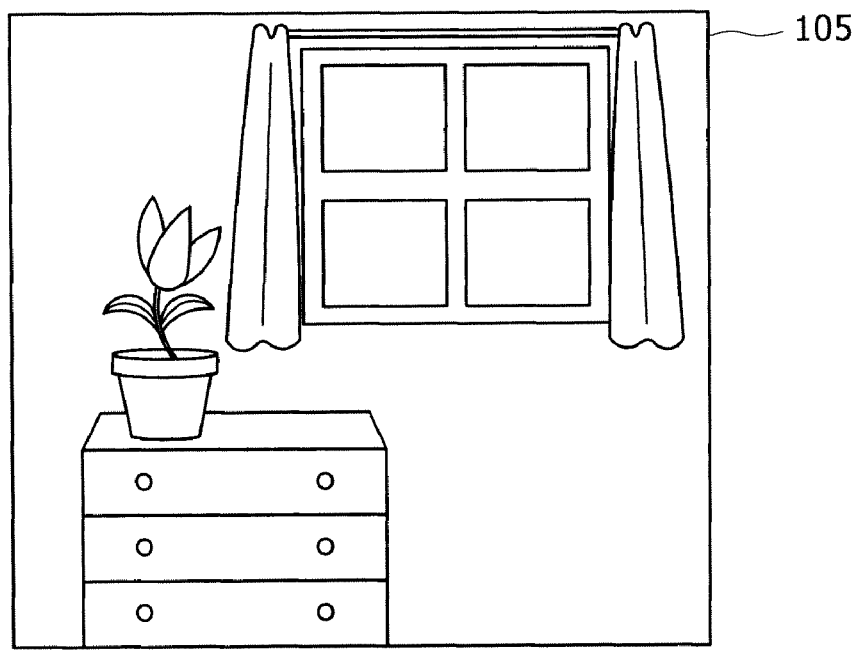
FIG. 17 is a schematic view showing display of a distribution image on the display screen.

If the three-directional operation key 4 is operated so as to be depressed by the user or the right-side operation key 5 is operated so as to be depressed by the user while one of the file names 102 is selected on the image list presentation screen 100 (including that one on which the display substance is varied) displayed on the display section 3, that is, while the cursor 103 is superposed on the file name 102, then the display control section 27 recognizes that the selection of the selection decision file name 102 is decided definitely. Then, the display control section 27 notifies the image data reproduction section 30 of the selection decision file name 102 as a file name of the distribution image data to be reproduced through the main control section 20. Consequently, the display control section 27 causes the display section 3 to display such a distribution image 105 as shown in FIG. 17, which is obtained by a reproduction process of the distribution image data by the image data reproduction section 30, in place of the image list presentation screen 100.

If the right-side operation key 5 is operated so as to be depressed while the distribution image 105 is displayed on the display section 3, then the display control section 27 recognizes that the distribution image data to be reproduced is to be changed over to the immediately succeeding distribution image data (that is, image feeding) in accordance with the distribution image data list. Thus, the display control section 27 performs a process similar to that described above while setting the file name of the immediately succeeding distribution image data as the selection decision file name. Consequently, the display control section 27 changes over the distribution image 105 to be displayed on the display section 3. On the other hand, if the left-side operation key 6 is operated so as to be depressed while the distribution image 105 is displayed on the display section 3, then the display control section 27 recognizes that the distribution image data to be reproduced is to be changed over to the immediately preceding distribution image data (that is, image reverse feeding) in accordance with the distribution image data list. Thus, the display control section 27 performs a process similar to that described above while setting the file name of the immediately preceding distribution image data as the selection decision file name. Consequently, the display control section 27 changes over the distribution image 105 to be displayed on the display section 3.

Figure 18:
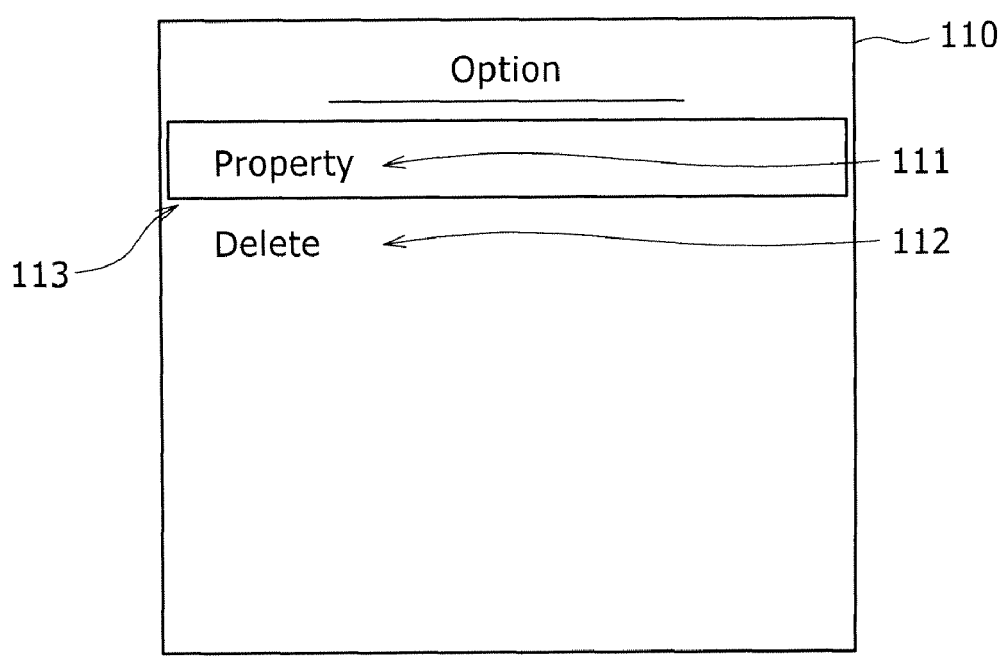
FIG. 18 is a schematic view showing a configuration of an image option screen.

Incidentally, if the option key 8 is operated so as to be depressed while the distribution image 105 is displayed on the display section 3, then the display control section 27 recognizes that an instruction to display an option screen for a distribution image is issued. Thus, the display control section 27 reads out image option screen data stored in advance in the storage section 23. Then, the display control section 27 signals the image option screen data to the display section 3 to cause the display section 3 to display such an image option screen 110 as shown in FIG. 18 based on the image option screen data. Referring to FIG. 18, the image option screen 110 includes display of a list in which, as selection items, an image information presentation choice 111 for allowing the user to select presentation of distribution image related information corresponding to distribution image data of the selection decision file name 102 and a deletion choice 112 for deleting the distribution image data of the selection decision file name 102 are arranged in order from the housing first end side toward the housing second end side along the housing lengthwise direction. Also a cursor 113 for allowing the user to select one of the image information presentation choice 111 and the deletion choice 112 displayed in a list is displayed in a superposed relationship on one of the image information presentation choice 111 and the deletion choice 112 on the image option screen 110. The cursor 113 has a reverse display function similarly as described hereinabove.

Figure 19:
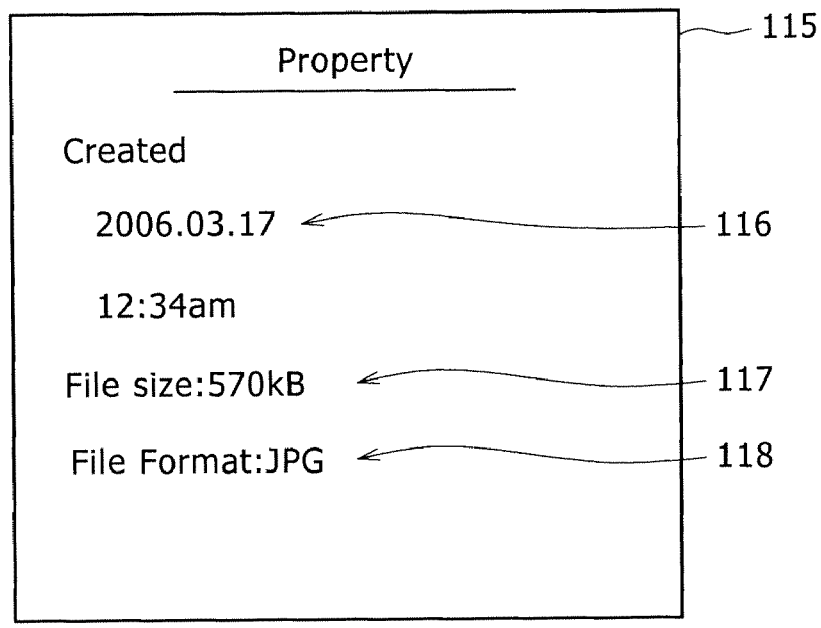
FIG. 19 is a schematic view showing a configuration of an image information presentation screen.

Then, if the three-directional operation key 4 is operated so as to be depressed by the user while the image option screen 110 is displayed on the display section 3 and the image information presentation choice 111 is selected, that is, the cursor 113 is superposed on the image information presentation choice 111, then the display control section 27 recognizes that the selection of the image information presentation choice 111 is decided definitely. Thus, the display control section 27 reads out image information presentation screen data stored in advance in the storage section 23. Further, the display control section 27 acquires distribution image related information corresponding to the distribution image data of the selection decision file name 102 from the image data search section 29 through the main control section 20. Then, the display control section 27 synthesizes the distribution image related information with the image information presentation screen data and signals resulting synthetic display screen data to the display section 3. Consequently, the display control section 27 causes the display section 3 to display such an image information presentation screen 115 as shown in FIG. 19 based on the synthetic display screen data in place of the distribution image 105. Referring to FIG. 19, the image option screen 110 includes display of a list in which storage time 116, a data size 117 and a data format 118 relating to the distribution image data of the selection decision file name 102 are juxtaposed in order from the housing first end side toward the housing second end side along the housing lengthwise direction. Accordingly, the display control section 27 can cause the display section 3 to display the image information presentation screen 115 to particularly notify the user of the substance of the distribution image related information relating to the distribution image data of the selection decision file name 102.

If the three-directional operation key 4 is operated so as to be depressed by the user while, for example, the radio broadcast selection icon 43 is selected, that is, the cursor 50 is superposed on the radio broadcast selection icon 43, on the menu screen 40 displayed on the display section 3, then the display control section 27 recognizes that the selection of the radio broadcast selection icon 43 is decided definitely. Then, the display control section 27 reads out radio broadcast reception screen data stored in advance in the storage section 23 and signals the read out data to the display section 3. Consequently, the display section 3 causes the display section 3 to display such a radio broadcast reception screen 120 as shown in FIG. 20 based on the radio broadcast reception screen data in place of the menu screen 40.

Figure 20:
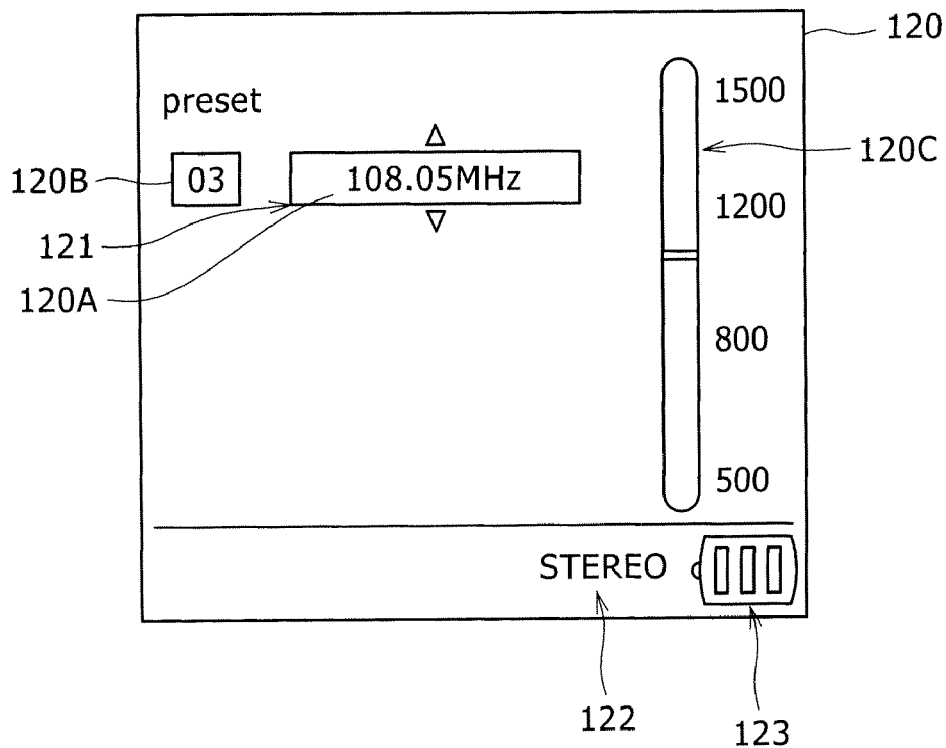
FIG. 20 is a schematic view showing a configuration of a radio broadcast reception screen.

Referring to FIG. 20, the radio broadcast reception screen 120 includes a frequency display region 120A for displaying a frequency, a registration number display region 120B for displaying a registration number of a broadcasting frequency registered in advance, and a frequency range notification section 120C representative of a frequency range which can be received. Also a cursor 121 for allowing the user to arbitrarily select one of the frequency display region 120A and the registration number display region 120B is displayed on the radio broadcast reception screen 120. Further, a sound type notification icon 122 for notifying the user of which one of stereo sound and monaural sound the radio broadcast being received uses and a remaining amount notification icon 123 are displayed on the radio broadcast reception screen 120.

In this instance, if the right-side operation key 5 or the left-side operation key 6 is operated so as to be depressed while the radio broadcast reception screen 120 is displayed on the display section 3, then the display control section 27 recognizes that an instruction to adjust the cursor 121 to the frequency display region 120A or the registration number display region 120B is issued. Thus, the display control section 27 adjusts the cursor 121 to the frequency display region 120A or the registration number display region 120B on the radio broadcast reception screen 120. Then, if the three-directional operation key 4 is operated so as to be tilted to the housing first end side or the housing second end side while the cursor 121 is adjusted to the registration number display region 120B on the radio broadcast reception screen 120, then the display control section 27 recognizes that an instruction to change over the registration number is issued. Thus, the display control section 27 changes over the registration number to be displayed in the registration number display region 120B and causes a broadcasting frequency (that is, registered broadcasting frequency) corresponding to the registration number displayed in the registration number display region 120B to be displayed in the frequency display region 120A. In this manner, the display control section 27 allows the user to arbitrarily select the broadcasting frequency of a radio broadcast to be received, that is, the broadcasting frequency displayed in the frequency display region 120A, on the radio broadcast reception screen 120 and notifies the tuner section 24 of the selected broadcasting frequency. Consequently, the display control section 27 allows the user to enjoy the radio broadcast.

On the other hand, if the three-directional operation key 4 is operated so as to be tilted toward the housing first end side or the housing second end side for a period of time shorter than a predetermined period of time set in advance while the cursor 121 is adjusted to the frequency display region 120A on the radio broadcast reception screen 120, then the display control section 27 notifies the tuner section 24 so that the frequency to be received may be varied by a predetermined pitch (for example, by a 0.05 MHz pitch) every time and causes the varied frequency to be displayed in the frequency display region 120A. Consequently, the tuner section 24 successively changes the frequency to be received and outputs a result of reception of the changed frequency from the earphone. Consequently, the broadcasting frequency is detected while the user is permitted to actually listen to the sound. On the other hand, if the three-directional operation key 4 in this instance is kept tilted toward the housing first end side or the housing second end side for more than the predetermined period of time, then the display control section 27 causes the tuner section 24 to automatically detect a broadcasting frequency of a radio broadcast from among frequencies which can be received by the tuner section 24 and causes the detected broadcasting frequency to be displayed in the frequency display region 120A of the radio broadcast reception screen 120. In this manner, it is possible for the display control section 27 to cause the broadcasting frequency of a radio broadcast which can be received to be detected manually or automatically.

Figure 21:
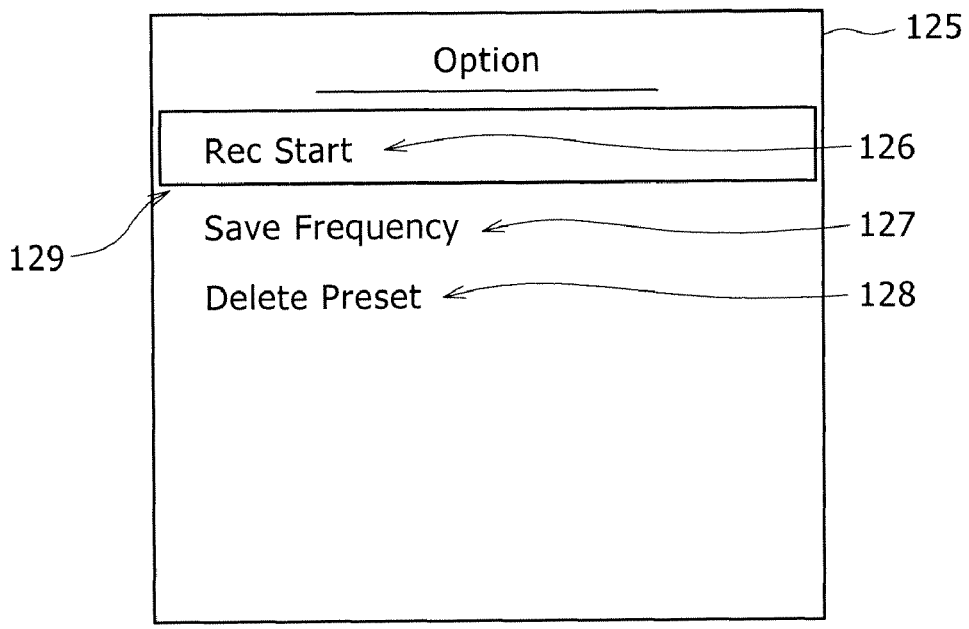
FIG. 21 is a schematic view showing a configuration of a radio broadcast option screen.

If the option key 8 is operated so as to be depressed while the radio broadcast reception screen 120 is displayed on the display section 3, then the display control section 27 recognizes that an instruction to display an option screen for a radio broadcast is issued. Thus, the display control section 27 reads out radio broadcast option screen data stored in advance in the storage section 23 and signals the read out data to the display section 3. Consequently, the display control section 27 causes the display section 3 to display such a radio broadcast option screen 125 as shown in FIG. 21 based on the radio broadcast operation screen data. Referring to FIG. 21, the radio broadcast option screen 125 includes display of a list in which, as selection items, a radio broadcast recording choice 126, a frequency registration choice 127, and a frequency deletion choice 128 for deleting a registered broadcasting frequency are juxtaposed in order from the housing first end side toward the housing second end side along the housing lengthwise direction. Also a cursor 129 for selecting one of the radio broadcast recording choice 126, frequency registration choice 127 and frequency deletion choice 128 displayed in a list is displayed in a superposed relationship with one of the radio broadcast recording choice 126, frequency registration choice 127 and frequency deletion choice 128 on the radio broadcast option screen 125. The cursor 129 has a reverse display function similarly as described hereinabove.

Then, if the three-directional operation key 4 is operated so as to be depressed by the user while the radio broadcast option screen 125 is displayed on the display section 3 and the radio broadcast recording choice 126 is selected, that is, the cursor 129 is superposed on the radio broadcast recording choice 126, then the display control section 27 recognizes that the selection of the radio broadcast recording choice 126 is decided definitely. Then, the display control section 27 issues a request to the recording processing section 25 to record a radio broadcast being currently received and reads out radio broadcast recording screen data stored in advance in the storage section 23. Further, the display control section 27 acquires information (which later makes part of recording radio related information) relating to a radio broadcast to be recorded from the recording processing section 25 through the main control section 20. Then, the display control section 27 synthesizes the acquired information with the radio broadcast recording screen data to obtain synthetic display screen data and signals the synthetic display screen data to the display section 3. Consequently, the display control section 27 causes the display section 3 to display such a radio broadcast recording screen 130 as shown in FIG. 22 based on the synthetic display screen data in place of the radio broadcast option screen 125.

Figure 22:
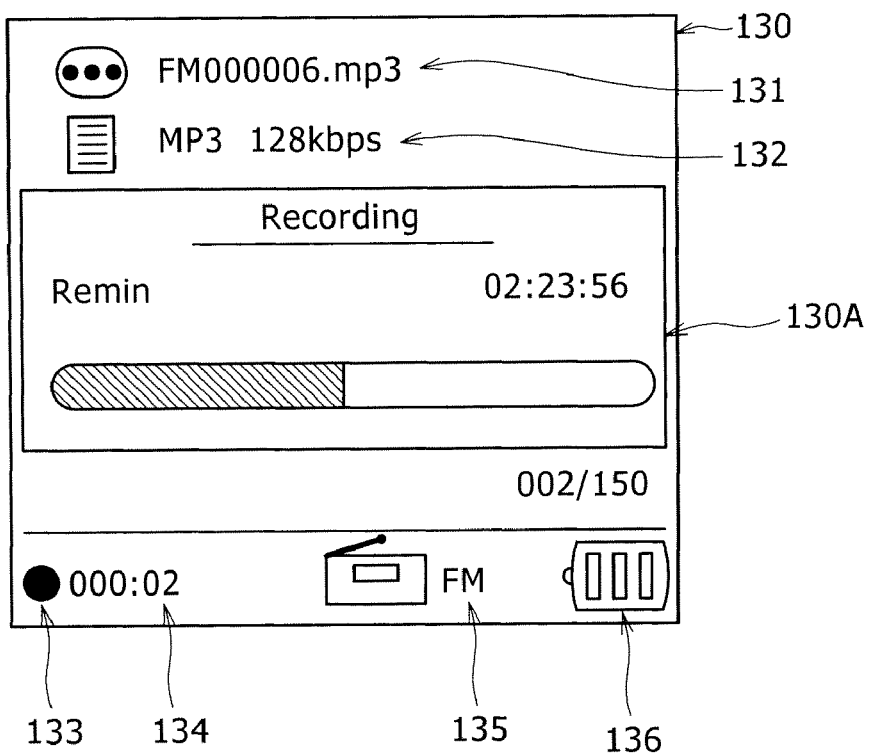
FIG. 22 is a schematic view showing a configuration of a radio broadcast recording screen.

Referring to FIG. 22, a file name 131 and a data format 132 of the recording radio data produced by a recording process for the radio broadcast are displayed on the radio broadcast recording screen 130. Further, a recording situation notification region 130A is provided at a central location of the radio broadcast recording screen 130. A time notification bar, time information and so forth indicative of a remaining recording permitting time period with respect to a maximum recording permitting time period (which is set, for example, to several hours and is a maximum recording permitting time period for a total recording time period of all recording radio broadcasts) set for recording of radio broadcasts in advance are displayed in the recording situation notification region 130A. Also a recording notification icon 133 for the notification that a radio broadcast is being recorded, recording elapsed time 134 of the radio broadcast being currently recorded, a recording object notification icon 135 for the notification that the current recording object is a radio broadcast and a remaining amount notification icon 136 are displayed on the housing second end side on the radio broadcast recording screen 130. Accordingly, the display control section 27 can notify the user of various kinds of information such as a recording situation and so forth regarding recording of a radio broadcast through the radio broadcast recording screen 130 displayed on the display section 3.

Figure 23:
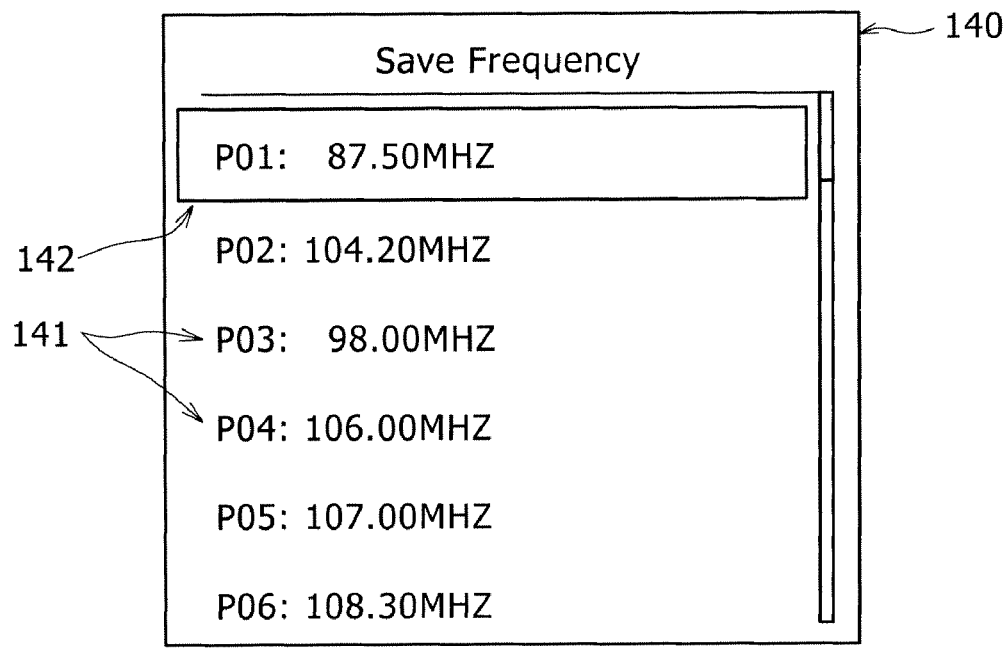
FIG. 23 is a schematic view showing a configuration of a frequency registration screen.

If the option key 8 is operated so as to be depressed while the broadcasting frequency of a radio broadcast is detected manually or automatically on the radio broadcast reception screen 120 and the frequency registration choice 127 is selected on the radio broadcast option screen 125 shown on the display section 3 in response to the depression operation and then the selection is decided definitely, then the display control section 27 reads out the frequency registration screen data from the storage section 23. Then, the display control section 27 signals the frequency registration screen data to the display section 3 so that the display section 3 displays such a frequency registration screen 140 as shown in FIG. 23 based on the frequency registration screen data in place of the radio broadcast option screen 125. Referring to FIG. 23, the frequency registration screen 140 includes display of a list in which, as selection items, a plurality of registration numbers 141 to be used for registration of broadcasting frequencies are juxtaposed from the housing first end side toward the housing second end side along the housing lengthwise direction. Further, on the frequency registration screen 140, a broadcasting frequency registered already is displayed alongside a corresponding registration number. Further, a cursor 142 which collectively surrounds a registration number and a corresponding broadcasting frequency is displayed on the frequency registration screen 140. The cursor 142 has a reverse display function.

If the three-directional operation key 4 is operated so as to be tilted toward the housing first end side or the housing second end side by the user while the frequency registration screen 140 is displayed on the display section 3, then the display control section 27 recognizes that an instruction to shift the cursor 142 by one selection item distance toward the housing first end side or the housing second end side along the housing lengthwise direction is issued. Thus, the display control section 27 causes the display section 3 to move the cursor 142 on the frequency registration screen 140 to select a desired one of the registration numbers 141. Then, if the three-directional operation key 4 is operated so as to be depressed by the user while one of the registration numbers 141 is selected, that is, the cursor 142 is superposed on one of the registration numbers 141, then the display control section 27 recognizes that an instruction to register a broadcast frequency is issued. Thus, the display control section 27 registers the broadcast frequency detected on the radio broadcast reception screen 120 formerly in an associated relationship with the selected registration number 141 and causes the registered broadcasting frequency to be displayed alongside the registration number 141. The display control section 27 registers the broadcasting frequency of the radio broadcast in this manner and notifies the user of the registered broadcast frequency through the frequency registration screen 140. In order to delete a broadcast frequency registered already, the display control section 27 displays the frequency registration screen 140 in response to the selection decision of the frequency deletion choice 128 from the radio broadcast option screen 125 and allows the user to select the broadcast frequency to be deleted on the frequency registration screen 140 and then deletes the broadcast frequency.

On the other hand, if the three-directional operation key 4 is operated so as to be depressed by the user while, for example, the recording selection icon 44 is selected on the menu screen 40 displayed on the display section 3, that is, the cursor 50 is superposed on the recording selection icon 44, then the display control section 27 recognizes that the selection of the recording selection icon 44 is decided definitely. Thus, the display control section 27 acquires the recording data list described hereinabove from the recording data search section 31 through the main control section 20. Also, the display control section 27 reads out the recording screen data stored in advance in the storage section 23. Further, the display control section 27 synthesizes the recording data list with the recording screen data and signals resulting synthetic display screen data to the display section 3. Consequently, the display control section 27 causes the display section 3 to display such a recording screen 145 as shown in FIG. 24 based on the synthetic display screen data in place of the menu screen 40.

Figure 24:
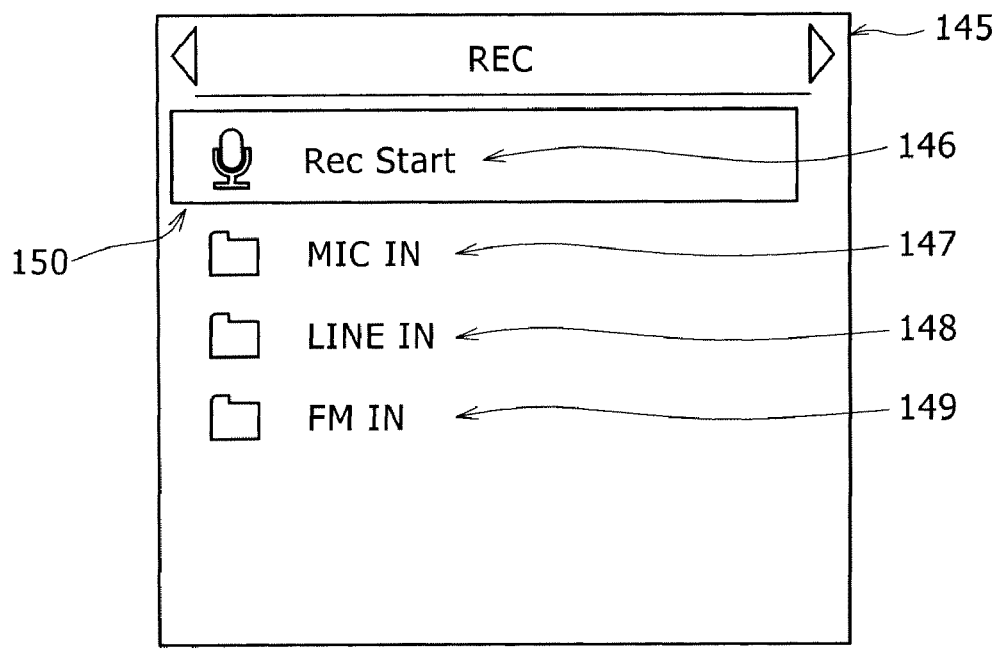
FIG. 24 is a schematic view showing a configuration of a recording screen.

Referring to FIG. 24, the recording screen 145 includes display of a list in which, as selection items, a recording choice 146, a folder name 147 of the recording radio folder, a folder name 148 of the recording musical piece folder and a folder name 149 of the recording sound folder are juxtaposed in order from the housing first end side toward the housing second end side along the housing lengthwise direction. Also a cursor 150 for selecting one of the recording choice 146, folder name 147 of the recording radio folder, folder name 148 of the recording musical piece folder and folder name 149 of the recording sound folder displayed in a list is displayed in a superposed relationship on one of the recording choice 146, folder name 147 of the recording radio folder, folder name 148 of the recording musical piece folder and folder name 149 of the recording sound folder on the recording screen 145. The cursor 150 has a reverse display function.

If the three-directional operation key 4 is operated so as to be tilted toward the housing one end side or the housing second end side by the user while the recording screen 145 is displayed on the display section 3, then the display control section 27 recognizes that a request to shift the cursor 150 by one selection item distance toward the housing first end side or the housing second end side along the housing lengthwise direction is issued. Thus, the display control section 27 moves the cursor 150 on the recording screen 145 to arbitrarily select one of the recording choice 146, folder name 147 of the recording radio folder, folder name 148 of the recording musical piece folder and folder name 149 of the recording sound folder. Then, if the three-directional operation key 4 is operated so as to be depressed by the user while, for example, the recording choice 146 is selected, that is, the cursor 150 is superposed on the recording choice 146, then the display control section 27 recognizes that the selection of the recording choice 146 is decided definitely. Then, the display control section 27 causes the display section 3 to display a recording object selector screen 151 in a superposed relationship on the recording screen 145 as seen in FIG. 25.

Figure 25:
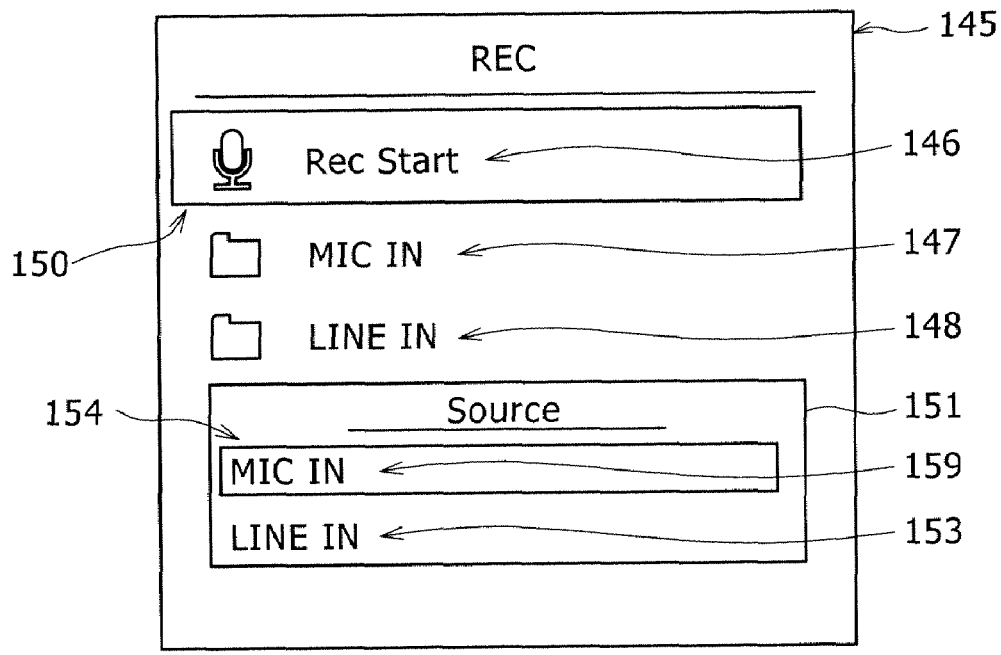
FIG. 25 is a schematic view illustrating selection of a recording object on the recording screen.

Referring to FIG. 25, the recording object selector screen 151 includes display of a list in which, as selection items, a collected sound choice 152 for the selection of collected sound as a recording object and a transfer musical piece choice 153 for the selection of a transfer musical piece as the recording object are juxtaposed in order from the housing first end side toward the housing second end side along the housing lengthwise direction. Also a cursor 154 for the selection of one of the collected sound choice 152 and the transfer musical piece choice 153 is displayed in a superposed relationship on one of the collected sound choice 152 and the transfer musical piece choice 153 on the recording object selector screen 151. The cursor 154 has a reverse display function. If the three-directional operation key 4 is operated so as to be tilted toward the housing first end side or the housing second end side by the user while the recording object selector screen 151 is displayed on the recording screen 145, then the display control section 27 recognizes that a request to shift the cursor 154 by one selection item distance toward the housing first end side or the housing second end side along the housing lengthwise direction is issued. Thus, the display control section 27 moves the cursor 154 on the recording object selector screen 151 to select a desired one of the collected sound choice 152 and the transfer musical piece choice 153.

If the three-directional operation key 4 is operated so as to be depressed by the user while the collected sound choice 152 is selected on the recording object selector screen 151, that is, the cursor 154 is superposed on the collected sound choice 152, then the display control section 27 recognizes that the selection of the collected sound choice 152 is decided definitely. Thus, the display control section 27 issues a request to the recording processing section 25 to record collected sound collected through the microphone 14. On the other hand, if the three-directional operation key 4 is operated so as to be depressed while the transfer musical piece choice 153 is selected on the recording object selector screen 151, that is, the cursor 154 is superposed on the transfer musical piece choice 153, then the display control section 27 recognizes that the selection of the transfer musical piece choice 153 is decided definitely. Thus, the display control section 27 issues a request to the recording processing section 25 to record a transfer musical piece transferred from the external reproduction apparatus on which the transfer musical piece is reproduced. Consequently, the display control section 27 can cause the recording processing section 25 to record collected sound and the transfer musical piece. Also in such recording, the display control section 27 executes a process substantially similar to that upon recording of a radio broadcast described hereinabove. Consequently, the display control section 27 can cause the display section 3 to display a collected sound recording screen or a transfer musical piece recording screen substantially similar to the radio broadcast recording screen 130 in place of the recording screen 145 to notify the user of various kinds of information such as a recording situation regarding recording of collected sound or a transfer musical piece.

If the three-directional operation key 4 is operated so as to be depressed by the user while the folder name 147 of the recording radio folder, folder name 148 of the recording musical piece folder or folder name 149 of the recording sound folder is selected on the recording screen 145, that is, the cursor 150 is supposed on one of the folder names mentioned, then the display control section 27 recognizes that the selection of the folder name 147 of the recording radio folder, folder name 148 of the recording musical piece folder or folder name 149 of the recording sound folder is decided definitely. Then, the display control section 27 reads out the recording radio list presentation screen data, recording music list presentation screen data or recording sound list presentation screen data from the storage section 23 and synthesizes, based on the recording data list, the file name of the corresponding recording radio data, file name of corresponding recording music data or file name of corresponding recording sound data with the read out screen data. Then, the display control section 27 signals resulting data to the display section 3. Consequently, the display control section 27 causes the display section 3 to display a recording radio list presentation screen, a recording music list presentation screen or a recording sound list presentation screen not shown having a configuration substantially similar to that of the musical piece list presentation screen 55 described hereinabove in place of the recording screen 145.

Accordingly, similarly as upon reproduction of a distribution musical piece, the display control section 27 allows the user to select recording radio data, recording music data or recording sound data to be reproduced on the recording radio list presentation screen, recording music list presentation screen or recording sound list presentation screen, and issues a request to the recording data reproduction section 32 to perform a reproduction process of the selected data. Also at this time, the display control section 27 causes the display section 3 to display a recording radio reproduction screen, a recording music reproduction screen or a recording sound reproduction screen not shown having a configuration substantially similar to that of the music reproduction screen 60 described hereinabove in place of the recording radio list presentation screen, recording music list presentation screen or recording sound list presentation screen. Incidentally, the display control section 27 causes the display section 3 to display the data format, recording date and hour and so forth together with the file name of the recording radio data, file name of the recording music data or file name of the recording sound data produced by the recording process in place of the artist name 61, album title 62 and distribution music title 63 on the music reproduction screen 60 described hereinabove on the recording radio reproduction screen, recording music reproduction screen or recording sound reproduction screen.

Further, if the three-directional operation key 4 is operated so as to be depressed by the user while, for example, the table display selection icon 45 is selected on the menu screen 40 displayed on the display section 3, that is, the cursor 50 is superposed on the table display selection icon 45, then the display control section 27 recognizes that the selection of the table display selection icon 45 is decided definitely. Thus, the display control section 27 acquires the storage data list described hereinabove from the storage data search section 33 through the main control section 20. Further, the display control section 27 reads out table display presentation screen data stored in advance in the storage section 23. Then, the display control section 27 synthesizes the storage data list with the table display presentation screen data and signals resulting synthetic display screen data to the display section 3. Consequently, the display control section 27 causes the display section 3 to display such a table display screen 160 as shown in FIG. 26 based on the synthetic display screen data in place of the menu screen 40.

Figure 26:
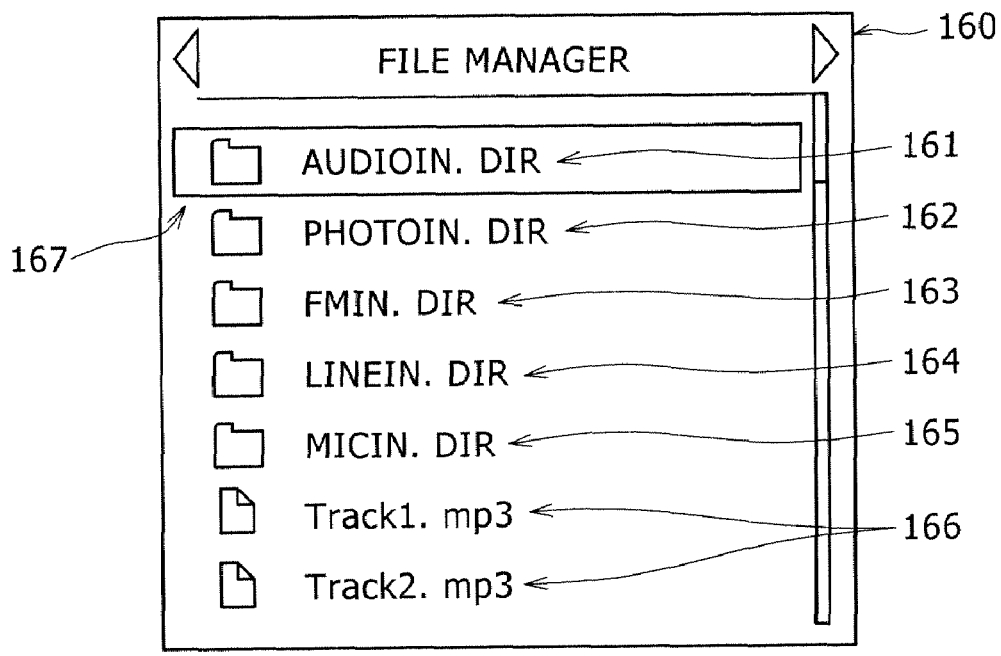
FIG. 26 is a schematic view showing a configuration of a table display screen.

Referring to FIG. 26, the table display screen 160 includes display of a list in which, as selection items, a folder name 161 of the distribution music folder, a folder name 162 of the distribution image folder, a folder name 163 of the recording radio folder, a folder name 164 of the recording musical piece folder, a folder name 165 of the recoding sound folder and file names 166 of distribution music data and distribution image data which are not associated with any of the distribution music folder and the distribution image folder are juxtaposed from the housing first end side toward the housing second end side along the housing lengthwise direction. Also a cursor 167 for selecting one of the folder names 161 to 165 and the file names 166 displayed in a list is displayed in a superposed relationship on the selected one of the folder names 161 to 165 and the file names 166 on the table display screen 160. The cursor 167 has a reverse display function.

If the three-directional operation key 4 is operated so as to be tilted toward the housing first end side or the housing second end side by the user while the table display screen 160 is displayed on the display section 3, then the display control section 27 recognizes that a request to shift the cursor 167 by one selection item distance toward the housing first end side or the housing second end side along the housing lengthwise direction is issued. Thus, the display control section 27 causes the cursor 167 to move on the table display screen 160 to select a desired one of the folder names 161 to 165 and the file names 166. Then, if the three-directional operation key 4 is operated so as to be depressed by the user while one of the folder names 161 to 165 is selected, that is, the cursor 167 is superposed on one of the folder names 161 to 165, then the display control section 27 recognizes that the selection of the one of the folder names 161 to 165 is decided definitely. Thereupon, the display control section 27 causes the display section 3 to display a music list presentation screen, an image list presentation screen, a recording radio list presentation screen, a recording music list presentation screen or a recording sound list presentation screen not shown for displaying only the file name of distribution music data, distribution image data, recording radio data, recording musical data or recording sound data associated with the distribution musical piece folder, distribution image folder, recording radio folder, recording music folder or recording sound folder of the folder name whose selection is decided finally in a configuration substantially similar to that of the musical piece list presentation screen 55.

If the option key 8 is operated so as to be depressed while the table display screen 160, music list presentation screen, image list presentation screen, recording radio list presentation screen, recording music list presentation screen or recording sound list presentation screen is displayed on the display section 3 and one of file names is selected, then the display control section 27 causes the display section 3 to display an option screen not shown similar to the image option screen 110 described hereinabove. Further, if a choice for selecting presentation of distribution music related information, distribution image related information, recording radio related information, recording musical piece related information or recording sound related information associated with distribution music data, distribution image data, recording radio data, recording music data or recording sound data, similar to the image information presentation choice 111 described hereinabove is selected on the option screen described above and then the selection is decided definitely, then the display control section 27 causes the display section 3 to display an information presentation screen not shown having a configuration substantially similar to that of the image information presentation screen 115 described hereinabove. Further, if a deletion choice is selected on the option screen and the selection is decided definitely, then the display control section 27 deletes the distribution music data, distribution image data, recording radio data, recording music data or recording sound data of the selection decision file name from the storage section 23 in response to the definite decision.

Figure 27:
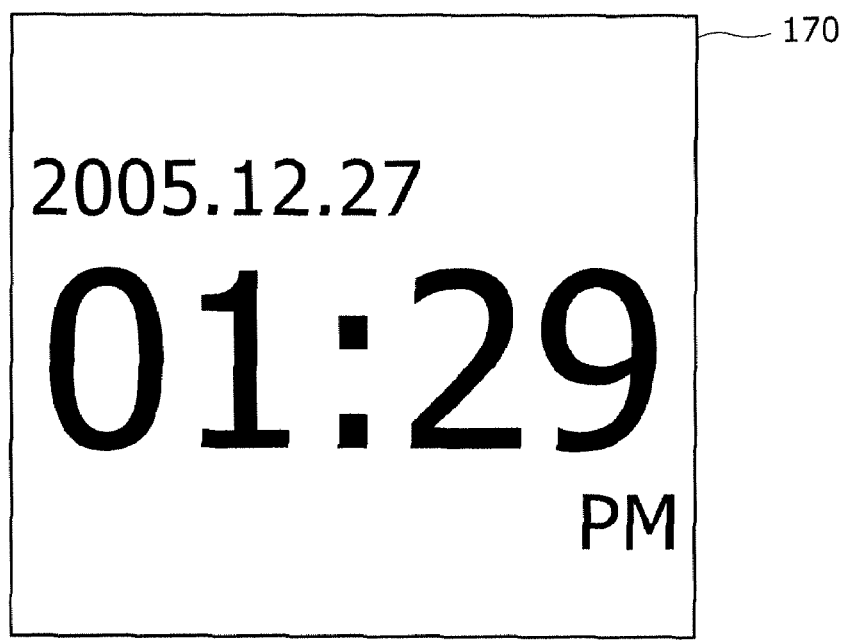
FIG. 27 is a schematic view showing a configuration of a time display screen.

Further, if the three-directional operation key 4 is operated so as to be depressed by the user while, for example, the time display selection icon 46 is selected on the menu screen 40 displayed on the display section 3, that is, the cursor 50 is superposed on the time display selection icon 46, then the display control section 27 recognizes that the selection of the time display selection icon 46 is decided definitely. Thus, the display control section 27 acquires time information representative of the date and hour at present from the time counting section 34 through the main control section 20. Further, the display control section 27 reads out time display screen data stored in advance in the storage section 23. Then, the display control section 27 signals the time display screen data with the time information added thereto to the display section 3. Consequently, the display control section 27 causes the display section 3 to display such a time display screen 170 as shown in FIG. 27 based on the time display screen data in place of the menu screen 40. In this instance, the time display screen 170 displays the year, month and day and the time at present. Accordingly, the display control section 27 can present the time at present through the time display screen 170 at any time when the user wants.

Figure 28:
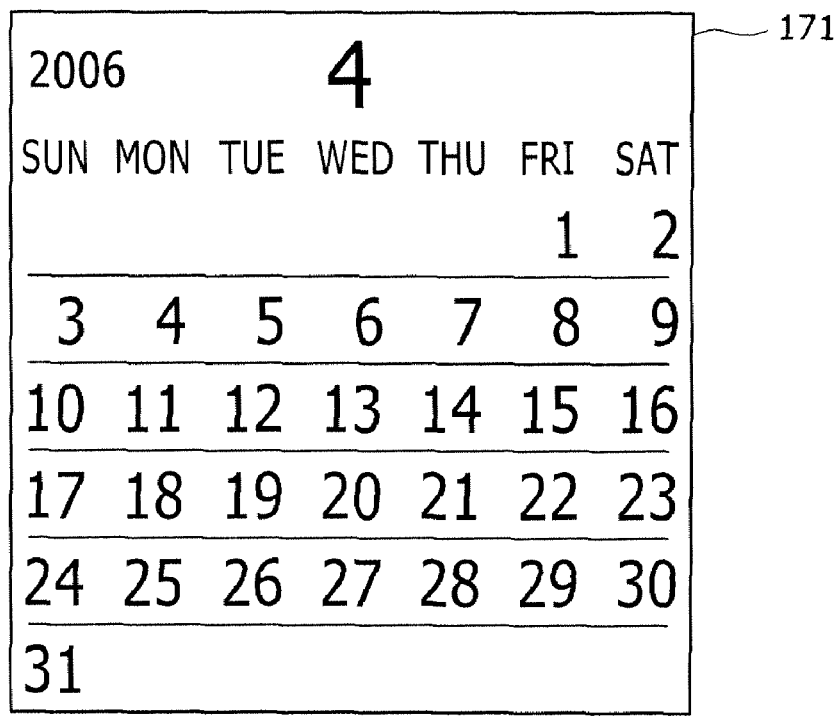
FIG. 28 is a schematic view showing a configuration of a calendar display screen.

On the other hand, if the three-directional operation key 4 is operated so as to be depressed by the user while, for example, the calendar display selection icon 47 is selected on the menu screen 40 displayed on the display section 3, that is, the cursor 50 is superposed on the calendar display selection icon 47, then the display control section 27 recognizes that the selection of the calendar display selection icon 47 is decided definitely. Thus, the display control section 27 acquires time information representative of the date and hour at present from the time counting section 34 through the main control section 20. Further, the display control section 27 searches calendar data stored in advance in the storage section 23 for those calendar data of this month based on the acquired time information and reads out the searched out calendar data from the storage section 23. Then, the display control section 27 processes the calendar data based on the acquired time information and signals resulting calendar data to the display section 3. Consequently, the display control section 27 causes the display section 3 to display such a calendar display screen 171 as shown in FIG. 28 based on the calendar data in place of the menu screen 40. In this instance, the calendar display screen 171 displays the date of today such that it can be distinguished from the other dates. Accordingly, the display control section 27 can present the date of today and the day of the week of today as well as the calendar of this month through the calendar display screen 171 at any time when the user wants.

Further, if the three-directional operation key 4 is operated so as to be depressed by the user while, for example, the setting selection icon 48 is selected on the menu screen 40 displayed on the display section 3, that is, the cursor 50 is superposed on the setting selection icon 48, then the display control section 27 recognizes that the selection of the setting selection icon 48 is decided definitely. Thus, the display control section 27 reads out setting item presentation screen data stored in advance in the storage section 23. Then, the display control section 27 signals the setting item presentation screen data to the display section 3. Consequently, the display control section 27 causes the display section 3 to display such a setting item presentation screen 172 as shown in FIG. 29 based on the setting item presentation screen data in place of the menu screen 40.

Figure 29:
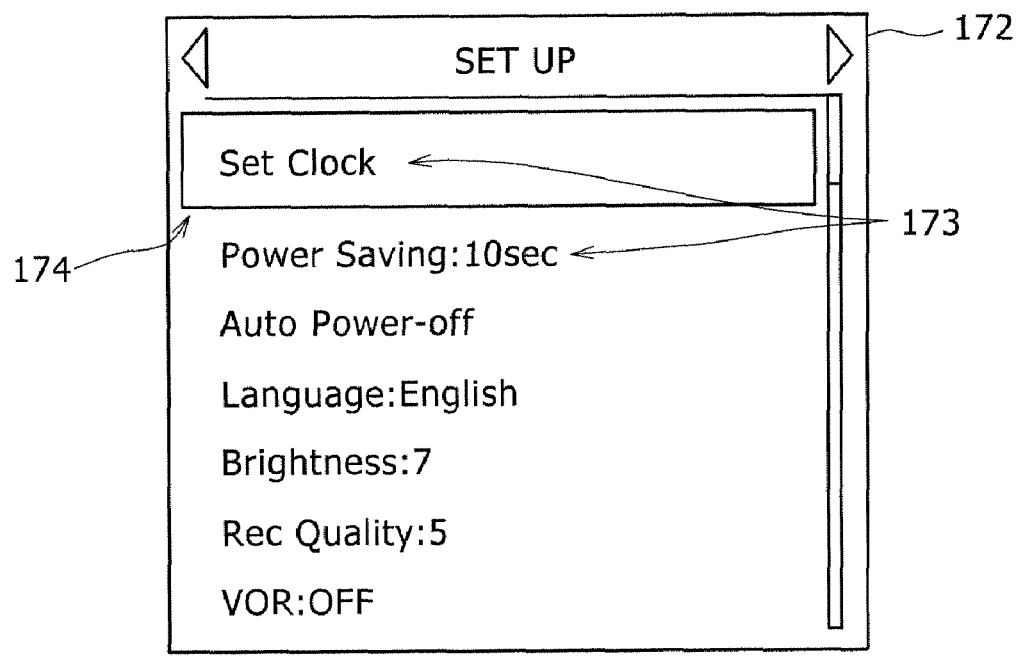
FIG. 29 is a schematic view showing a configuration of a setting item presentation screen.

Referring to FIG. 29, the setting item presentation screen 172 includes display of a list in which, as selection items, a plurality of setting item choices 173 for allowing selection of various setting items are juxtaposed in order from the housing first end side toward the housing second end side along the housing lengthwise direction. Also a cursor 174 for selecting one of the setting item choices 173 is displayed in a superposed relationship on one of the setting item choices 173 on the setting item presentation screen 172. The cursor 174 has a reverse display function. Thus, if the three-directional operation key 4 is operated so as to be tilted toward the housing first end side or the housing second end side along the housing lengthwise direction by the user while the setting item presentation screen 172 is displayed on the display section 3, then the display control section 27 recognizes that a request to move the cursor 174 by one selection item distance toward the housing first end side or the housing second end side along the housing lengthwise direction is issued. Thus, the display control section 27 causes the cursor 174 to move on the setting item presentation screen 172 to select a desired one of the setting item choices 173.

The setting items here may include a time setting item for setting the date and hour at present, an automatic power saving setting item for setting the time in which the display section 3 is to be turned off automatically after a point of time at which no operation of the unit is detected in order to prevent useless consumption of the battery, and an automatic power off setting item for setting the time in which the power supply to the portable terminal unit 1 is to be turned off automatically after a point of time at which a reproduction action, a recording action or the like action is stopped in order to prevent useless consumption of the battery. The setting items further include a language setting item for setting a language to be displayed on the display section 3, a luminance setting item for setting the luminance of the display section 3, and quality setting items for setting the qualities of recording radio data, recording music data and recording sound data to be produced by a recording process. The qualities mentioned are actually adjusted through the bit rate, sampling rate or the like, and each of the qualities is hereinafter referred to as recording quality. The setting items further include a setting item for setting whether or not a recording control function which automatically and temporarily stops recording of collected sound when a no-sound state continues but automatically resumes the recording when sound is issued should be implemented.

Thus, if the three-directional operation key 4 is operated so as to be depressed by the user while, for example, the setting item choice 173 for the selection of the quality setting tem is selected on the setting item presentation screen 172 displayed on the display section 3, that is, the cursor 174 is superposed on the setting item choice 173, then the display control section 27 recognizes that the selection of the setting item choice 173 is decided definitely. Thus, the display control section 27 reads out recording quality setting screen data stored in advance in the storage section 23 and signals the read out data to the display section 3. Consequently, the display control section 27 causes the display section 3 to display such a recording quality setting screen 180 as shown in FIG. 30 based on the recording quality setting screen data in place of the setting item presentation screen 172.

Figure 30:
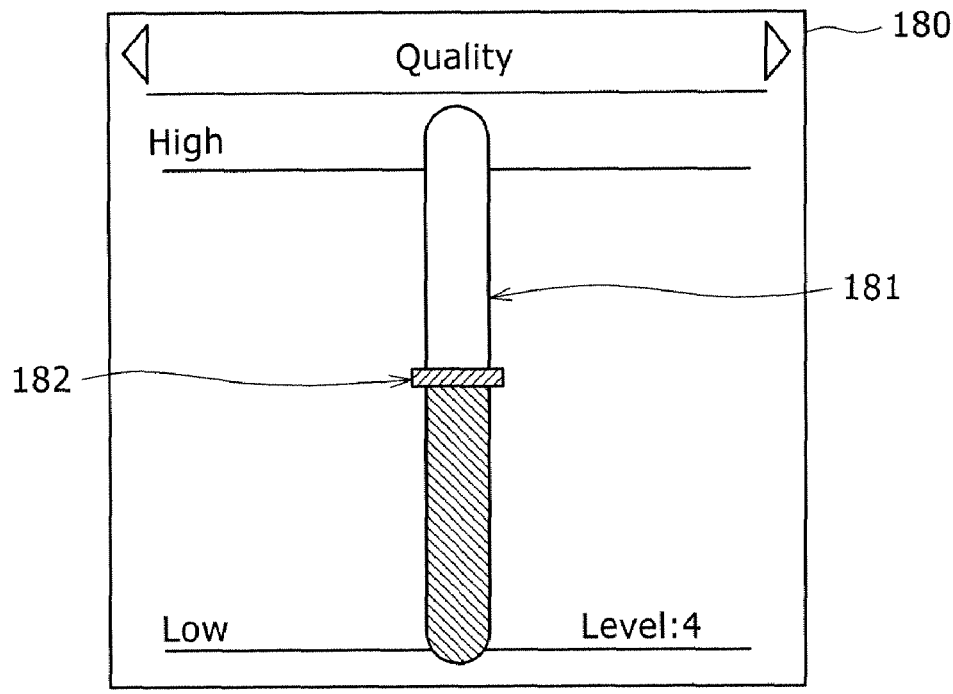
FIG. 30 is a schematic view showing a configuration of a recording sound quality setting screen.

Referring to FIG. 30, the recording quality setting screen 180 includes display of an elongated adjustment bar 181 for the level adjustment of the recording quality such that it extends in parallel to the housing lengthwise direction. Also a cursor 182 is displayed in a superposed relationship on the adjustment bar 181. The adjustment bar 181 is drawn as an adjustment knob for adjusting the recording quality. A plurality of graduations are set, for example, along the housing lengthwise direction on the adjustment bar 181 such that the cursor 182 can move toward the housing first end side or the housing second end side one by one graduation on the adjustment bar 181 to select a graduation.

Accordingly, if the three-directional operation key 4 is operated so as to be tilted toward the housing first end side while the recording quality setting screen 180 is displayed on the display section 3, then the display control section 27 recognizes that an instruction to move the cursor 182 toward the housing first end side along the housing lengthwise direction on the adjustment bar 181 is issued. Thus, the display control section 27 moves the cursor 182 by one graduation distance toward the housing first end side on the adjustment bar 181. On the other hand, if the three-directional operation key 4 is operated so as to be tilted toward the housing second end side, then the display control section 27 recognizes that an instruction to move the cursor 182 toward the housing second end side along the housing lengthwise direction on the adjustment bar 181 is issued. Thus, the display control section 27 moves the cursor 182 by one graduation distance toward the housing second end side on the adjustment bar 181. In this manner, the display control section 27 causes the cursor 182 to move on the adjustment bar 181 to select a graduation.

Then, if the three-directional operation key 4 is operated so as to be depressed by the user while the recording quality setting screen 180 is displayed on the display section 3, then the display control section 27 recognizes that the adjustment of the recording quality is completed. Then, the display control section 27 sets a recording quality in response to the value of the graduation selected on the adjustment bar 181 at the point of time. Incidentally, the display control section 27 can cause the display section 3 to display the setting item presentation screen 172 in place of the recording quality setting screen 180 thereby to change over the display to another display screen for setting so that setting can be performed continuously for another setting item.

It is to be noted that, in the present embodiment, the number of selection items which can be displayed at a time in a list is set in advance for each of the various display screens described hereinabove. Therefore, when a plurality of selection items may not be displayed collectively at a time on the display screen, the display control section 27 can scroll such selection items so that all selection items can be displayed similarly as in the case of the musical piece list presentation screen 55 described hereinabove.

Figure 31:
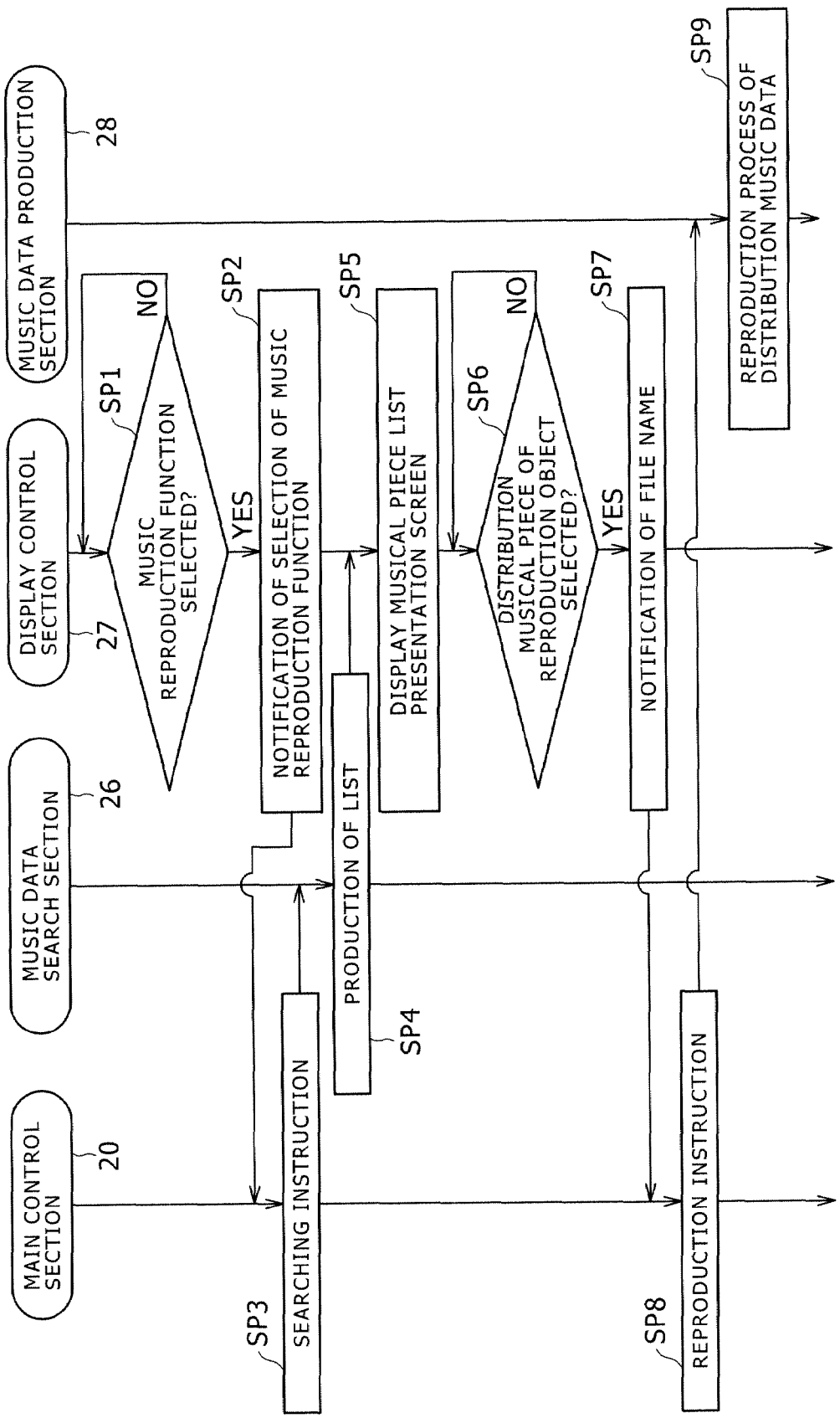
FIG. 31 is a flow chart illustrating a music reproduction processing procedure.

Now, a music reproduction processing procedure for reproducing a distribution musical piece is described with reference to FIG. 31. First at step SP1, the display control section 27 causes the display section 3 to display the menu screen 40 and waits in this state that the music reproduction function is selected by the user. Then, if the music reproduction selection icon 41 is selected on the menu screen 40 and the selection is decided definitely, then the processing advances to step SP2. At step SP2, the display control section 27 notifies the main control section 20 that the music reproduction function is selected. At step SP3, the main control section 20 issues an instruction to the music data search section 26 to search for distribution music data. Thus, at step SP4, the music data search section 26 searches for the file name of the distribution music data from among the file names of various data stored in the storage section 23 in accordance with the instruction and produces a distribution music data list based on a result of the search. Then, the music data search section 26 signals the distribution music data list to the display control section 27.

At step SP5, the display control section 27 produces a musical piece list presentation screen 55 using the distribution music data list and causes the display section 3 to display the musical piece list presentation screen 55. Thereafter, the processing advances to step SP6. At step SP6, the display control section 27 waits that distribution music data of an object of reproduction is selected. Then, when distribution music data of an object of reproduction is selected as a selection decision file name on the musical piece list presentation screen 55, the display control section 27 advances its processing to step SP7. At step SP7, the display control section 27 notifies the main control section 20 of the selection decision file name of the distribution music data of the reproduction object. At step SP8, the main control section 20 instructs the music data reproduction section 28 to perform a reproduction process of the distribution music data of the selection decision file name. Consequently, the music data reproduction section 28 fetches the distribution music data selected by the user from the storage section 23 through the music data search section 26 and performs a reproduction process of the fetched distribution music data. Then, the music data reproduction section 28 signals a distribution music signal obtained by the reproduction process from the jack 15 to the headphone so that the distribution musical piece can be enjoyed by the user. Incidentally, reproduction of a distribution image and a recording radio broadcast, transfer musical piece and collected sound can be implemented by a procedure substantially similar to the music reproduction processing procedure.

Figure 32:
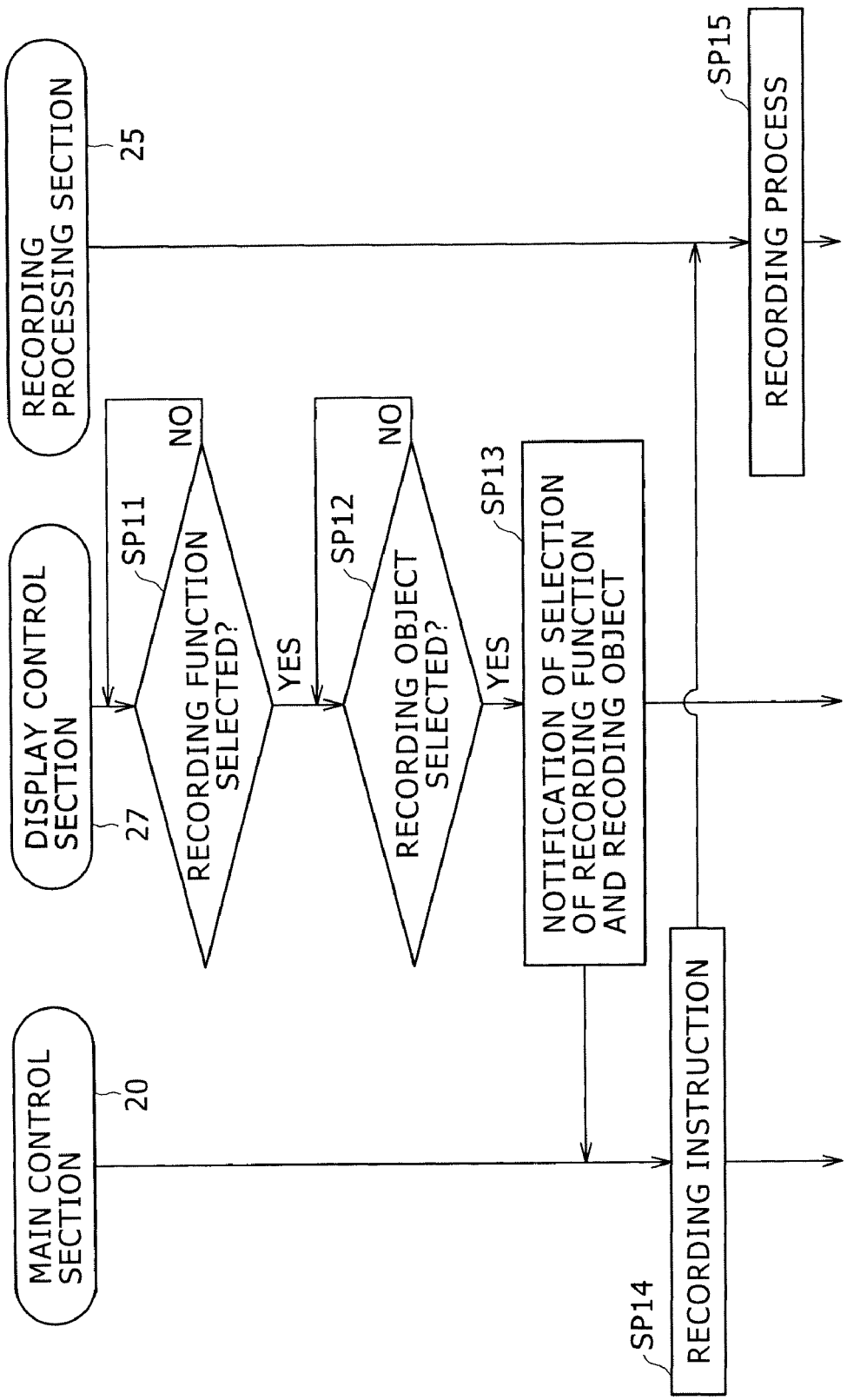
FIG. 32 is a flow chart illustrating a recording processing procedure.

Now, a recording processing procedure for recording a transfer musical piece or collected sound as a recording object is described with reference to FIG. 32. First at step SP11, the display control section 27 causes the display section 3 to display the menu screen 40 and waits in this state that the recording function is selected by the user. Then, when the recording selection icon 44 is selected on the menu screen 40 and the selection is decided definitely, the display control section 27 advances its processing to step SP12. At step SP12, the display control section 27 causes the display section 3 to display the recording screen 145 and waits that a recording object is selected. When a distribution musical piece or collected sound is selected as a recording object on the recording screen 145, the display control section 27 advances its processing to step SP13. At step SP13, the display control section 27 notifies the main control section 20 of the selection of the recording function and the recording object. Accordingly, at step SP14, the main control section 20 instructs the recording processing section 25 to perform a recording process of transfer music data of a transfer musical piece or a sound signal of collected sound selected as the recording object. Consequently, the recording processing section 25 fetches transfer music data reproduced by and transferred from the external reproduction apparatus and performs a recording process of the fetched data or the sound signal obtained by collecting sound through the microphone 14. Then, the recording processing section 25 stores recording music data or recording sound data obtained by the recording process into the storage section 23. Incidentally, also recording of a radio broadcast can be implemented by a procedure substantially similar to the recording processing procedure by the portable terminal unit 1.

Figure 34:
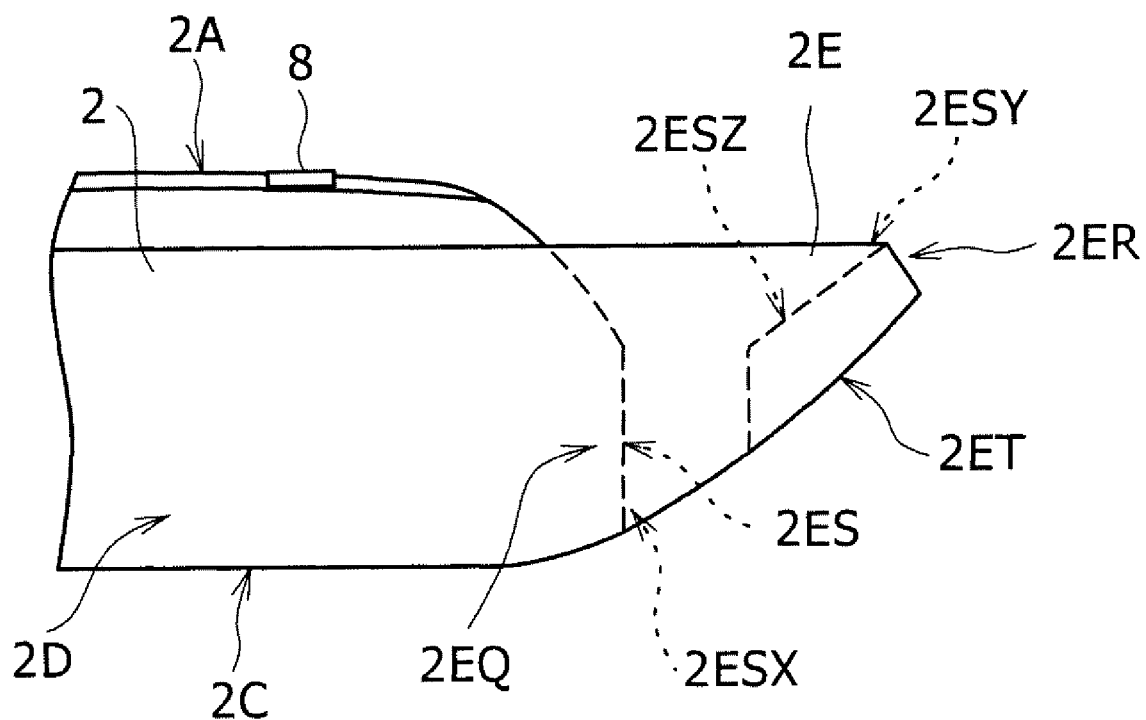
FIG. 34 is a schematic side elevational view showing the configuration of the frame element.
Figure 35:
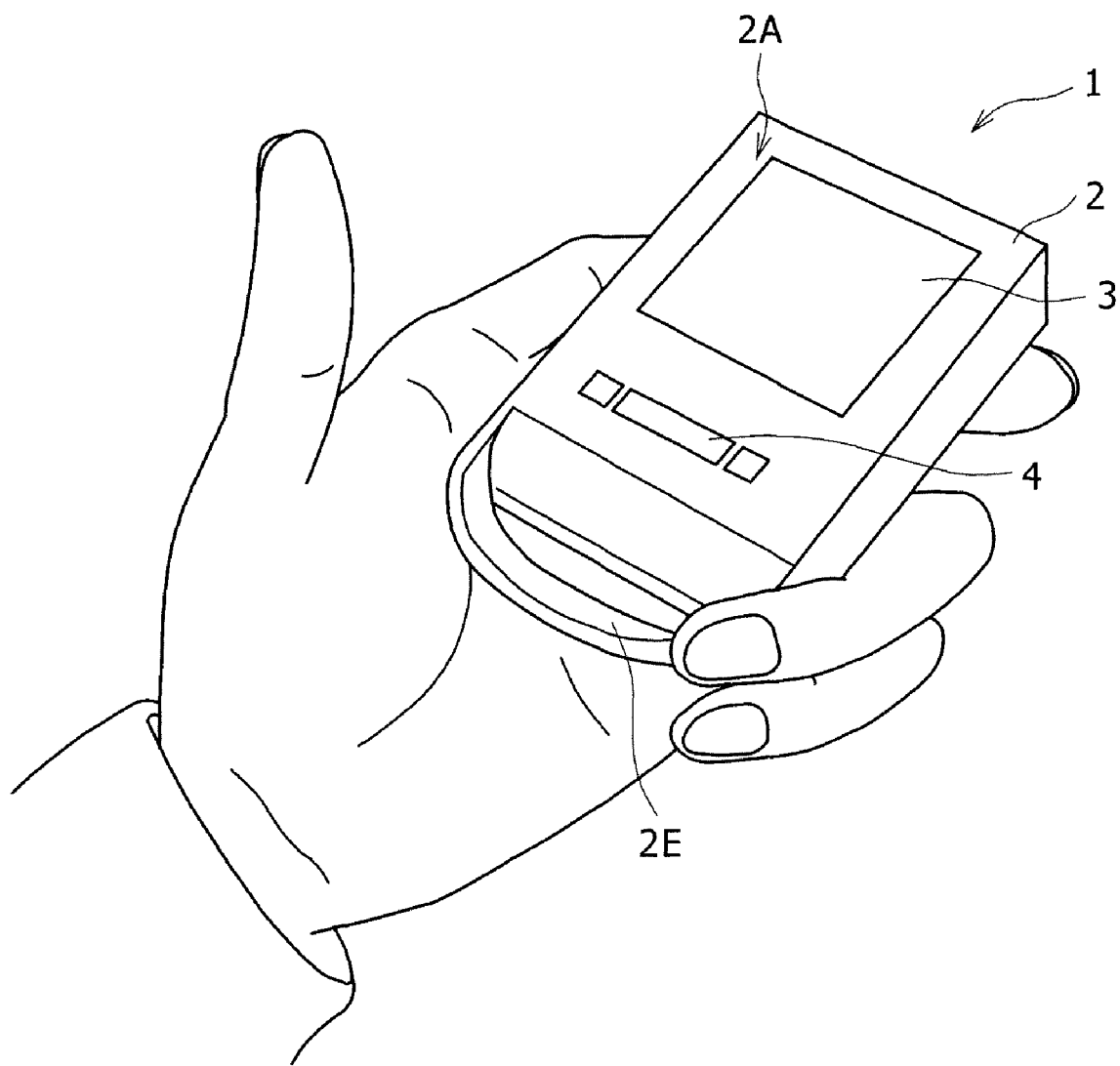
FIG. 35 is a schematic view showing the portable terminal unit gripped by a hand.

Referring now to FIGS. 33A, 33B and 34, the portable terminal unit 1 having the configuration described above is further configured such that a substantially U-shaped frame element 2E is provided at a portion of the housing 2 rather near to the housing back face 2C at the housing second end such that it projects along the housing lengthwise direction. The frame element 2E has a leftwardly and rightwardly symmetrical shape with respect to an imaginary straight line which extends along the housing lengthwise direction from the housing first end toward the housing second end and passes the center of the housing principal face 2A. The frame element 2E is attached at a first end 2EP and a second end 2EQ thereof to a position of the housing second end rather near to the housing right-side face 2B and another position of the housing second end rather near to the housing left-side face 2D, respectively. Accordingly, a hole portion 2ES is defined by a central portion of the housing second end and a substantially arcuate central portion 2ER of the frame element 2E at which the frame element 2E is spaced most from the housing second end. The hole portion 2ES extends along a direction (hereinafter referred to as housing thicknesswise direction) from the housing principal face 2A toward the housing back face 2C.

Particularly, the hole portion 2ES is formed in such a bugle-like shape that, on the housing back face 2C side, an inner face of the frame element 2E extends substantially in parallel to the housing thicknesswise direction over a circumference thereof, and on the housing principal face 2A side, the inner face gradually expands in the opposite directions toward the housing principal face 2A side and the central portion 2ER side of the frame element 2E. Accordingly, the hole portion 2ES has, as viewed from the housing back face 2C side, an opening (hereinafter referred to as back face side opening) 2ESX having a comparatively small dimension along the housing lengthwise direction, but has, as viewed from the housing principal face 2A side, an opening (hereinafter referred to as principal face side opening) 2ESY having a comparatively great dimension along the housing lengthwise direction.

Consequently, the housing principal face 2A of the housing 2 is inclined such that the housing second end side thereof gradually approaches the housing back face 2C. Further, an inner face (hereinafter referred to as principal face opening side inner face) 2ESZ of the frame element 2E on the principal face side opening 2ESY side is inclined toward the housing back face 2C in such a manner as to form a continuous curved face whose inclination angle gradually increases from the central portion 2ER toward both of the first end 2EP and the second end 2EQ. Accordingly, the housing 2 generally looks, when the housing principal face 2A is viewed as the front, miniaturized to the maximum by a visual effect. This is because, although the frame element 2E projects from the housing second end, the principal face side opening 2ESY has a comparatively great width, and the space on the housing back face 2C side can be peeped through the hole portion 2ES of a comparatively small width at a location remote from the principal face side opening 2ESY.

Meanwhile, the frame element 2E is formed such that the edge of the principal face side opening 2ESY extends substantially in parallel to the housing principal face 2A and the width of the frame element 2E gradually decreases from the housing second end side of the housing back face 2C toward the central portion 2ER. Consequently, a rear face (hereinafter referred to as frame back face) 2ET of the frame element 2E is inclined from the housing back face 2C toward the central portion 2ER in such a manner as to form a continuous curved face from the housing second end side of the housing back face 2C to the frame back face 2ET of the frame element 2E. Accordingly, the housing 2 generally looks, also when the housing back face 2C is viewed as the front, miniaturized to the maximum by a visual effect. This is because, although the frame element 2E projects from the housing second end, the frame back face 2ET is inclined such that it is spaced away from the eye point toward the central portion 2ER, and the space on the housing principal face 2A side can be peeped through the back face side opening 2ESX.

Incidentally, the housing 2 accommodates the external terminal 13, microphone 14 and jack 15 body juxtaposed along the housing widthwise direction on the housing first end side as described hereinabove with reference to FIGS. 1A and 1B. The housing 2 further accommodates, for example, a battery. In particular, the battery is accommodated at a portion of the housing 2 extending from the accommodating portion in which the external terminal 13, microphone 14 and jack 15 body are accommodated on the housing first end side toward the housing second end side. Meanwhile, the display section 3 is provided at a portion of the housing principal face 2A of the housing 2 rather near to the housing first end, and the operation keys 4 to 8 are arranged on the housing second end side with respect to the arranged position of the display section 3. The housing 2 has a size miniaturized to such a degree that the entire housing 2 having the configuration described above can be held in the palm of a hand of the user.

Meanwhile, the display section 3 displays various display screens on which, when the housing principal face 2A is viewed as the front such that the upper side of the line of sight is set to the housing first end side and the lower side of the line of sight is set to the housing second end side, characters and so forth can be visually observed in an ordinary state without being inverted as described hereinabove with reference to FIG. 3. Accordingly, when the housing 2 is gripped by a hand and operated, the housing 2 is inevitably gripped while being covered with the hand from the housing back face 2C side such that the housing first end side is positioned on the upper side of the line of sight while the housing second end side is positioned on the lower side of the line of sight. In this state, the operation keys 4 to 8 arranged collectively on the housing second end side, for example, of the housing principal face 2A of the housing 2 are operated by the thumb.

Then, although the length of the housing 2 itself along the housing lengthwise direction is comparatively small, in order to grip the housing 2 stably, it is necessary for the user to contact the palm thereof with the housing back face 2C over a portion as great as possible. Further, in order for the user to operate the operation keys 4 to 8 using the thumb without bending the thumb unnaturally while the housing 2 is gripped from the housing back face 2C side, when the housing 2 is gripped by the user, preferably the operation keys 4 to 8 are arranged at locations corresponding to or around the root portions of the forefinger and the middle finger if possible.

Therefore, taking such a use situation as just described into consideration, the frame element 2E is provided in a projecting manner at the housing second end side of the housing 2. In other words, the length of the housing back face 2C in the housing lengthwise direction is increased by the length of the frame element 2E. Accordingly, when the housing 2 or the frame element 2E is gripped by the user, the operation keys 4 to 8 on the housing second end side are located in the proximity of the root portions of the forefinger and the middle finger. Consequently, the user can operate the operation keys 4 to 8 without bending the thumb unnaturally while the housing 2 and the frame element 2E are gripped in a stable state in which the housing 2 and the frame element 2E contact over a comparatively great portion thereof with the palm of the user.

Further, since the frame element 2E is provided in such a manner that it projects from the housing second end of the housing 2, it acts as if the housing second end of the housing 2 were extended along the housing lengthwise direction. Therefore, when the frame element 2E is gripped from the housing back face 2C side together with the housing 2 by a hand and the operation keys 4 to 8 on the housing second end side are operated so as to be depressed, it is possible to disperse the depressing force to the storage section 23 thereby to avoid the depressing force from being concentrated on the housing second end side of the housing back face 2C. Consequently, when the operation keys 4 to 8 on the housing second end side are operated so as to be depressed, the frame element 2E prevents also the housing first end side of the housing 2 from being raised from the hand of the user and thereby prevents it from becoming difficult to grip the housing 2 stably.

Further, the frame element 2E is formed with such a continuous curved face which is curved toward the housing principal face 2A side over a region from the housing second end side of the housing back face 2C to the frame back face 2ET. Accordingly, when the housing 2 is gripped from the housing back face 2C side by a hand, the frame back face 2ET of the frame element 2E can contact with the palm of the hand without giving an unfamiliar feeling to the user, and consequently, the housing 2 can be gripped with a higher degree of stability. As the frame element 2E is gripped together with the housing 2 when the housing 2 is gripped from the housing back face 2C side by the user in order to operate the portable terminal unit 1 in this manner, the frame element 2E has a gripping assisting function of assisting the gripping of the housing 2.

Figure 36:
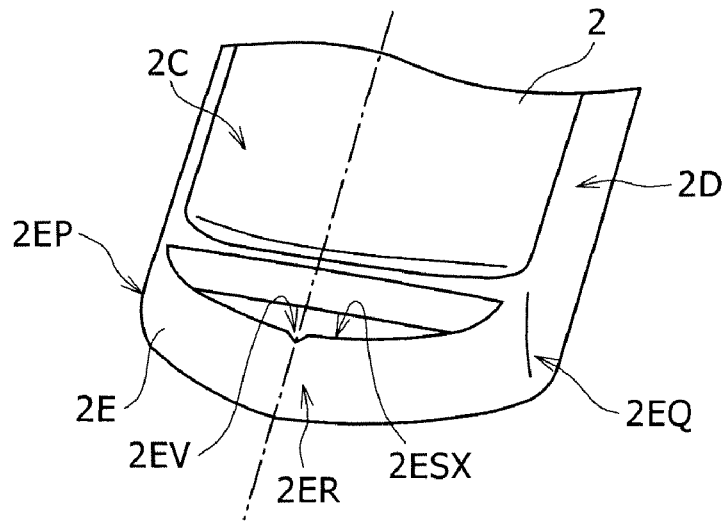
FIG. 36 is a schematic view showing a strap holding groove provided on the frame element.
Figure 37:
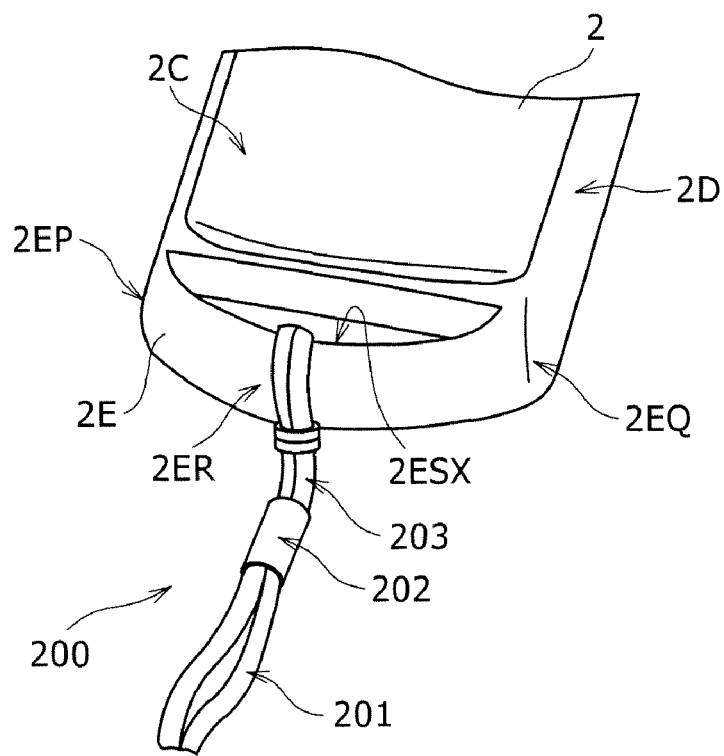
FIG. 37 is a schematic view illustrating attachment of a strap to the frame element.

In addition, the frame element 2E has a string holding groove 2EV formed thereon as seen in FIG. 36. In particular, referring to FIG. 36, the string holding groove 2EV is formed at a middle position of the surface of the edge of the back face side opening 2ESX on the central portion 2ER side, which is a position corresponding to an imaginary straight line which passes the housing principal face 2A along the housing lengthwise direction from the housing first end toward the housing second end, or in other words, a position opposing to the imaginary straight line which makes the boundary along which the frame element 2E is partitioned in a leftwardly and rightwardly symmetrical relationship. To the frame element 2E, a strap 200 which is used to suspend the portable terminal unit 1 from a hand, the neck or the like of the user can be attached as seen in FIG. 37. The strap 200 is held at the frame element 2E such that the opposite end portions of a strap string 201 to be suspended from a hand, the neck or the like of the user are inserted into a string fixing element 202 from one end portion and held by the string fixing element 202 and the opposite end portions of a comparatively short braid 203 which is to be bound directly to the portable terminal unit 1 are inserted into the string fixing element 202 from the other end portion and held by the string fixing element 202.

Actually, the braid 203 is fitted, at a portion of a ring thereof, into the hole portion 2ES from the back face side opening 2ESX or principal face side opening 2ESY and drawn out from the other principal face side opening 2ESY or back face side opening 2ESX, and then the strap string 201 is fitted into the ring of the braid 203 and tightened so as to be bound to the frame element 2E. The string holding groove 2EV is formed with a width with which at least one braid 203 can be fitted in the string holding groove 2EV. Accordingly, when the braid 203 of the strap 200 is bound to the frame element 2E, the frame element 2E holds two juxtaposed portions of the braid 203 (or one of the two portions) so as to be received in the string holding groove 2EV. Further, when the portable terminal unit 1 is suspended actually from a hand, the neck or the like of the user through the strap 200 while the braid 203 is held in such a manner as described above, since the braid 203 is tightened by the self weight of the portable terminal unit 1, the frame element 2E can hold the braid 203 in the string holding groove 2EV thereof such that the braid 203 is not displaced toward the first end 2EP side or the second end 2EQ side.

The string holding groove 2EV is formed such that it has an angle (edge) at a boundary portion thereof (that is, an edge of the string holding groove) with respect to the surface of an edge of the back face side opening 2ESX. Accordingly, the frame element 2E acts such that the corner thereof hooks the braid 203 so that the braid 203 may not be removed from the string holding groove 2EV even if the portable terminal unit 1 suspended on a hand, the neck or the like of the user, for example, through the strap 200 swings and the braid 203 held in the string holding groove 2EV tends to move out of the string holding groove 2EV. In other words, even if the portable terminal unit 1 suspended from the hand, neck or the like of the user through the strap 200 swings, the frame element 2E can hold the braid 203 substantially with certainty in the string holding groove 2EV so that the braid 203 may not be displaced from the middle portion of the frame element 2E toward the first end 2EP side or the second end 2EQ side. In this manner, the frame element 2E has also a braid holding function of holding the braid 203 of the strap 200 in addition to the gripping assisting function.

In the portable terminal unit 1 having the configuration described above, the display section 3 is arranged at a position of the housing principal face 2A of the housing 2 displaced to the housing first end side, and the operation keys 4 to 8 are arranged at another position of the housing principal face 2A which is displaced to the housing second end side from the display section arrangement position. Further, the portable terminal unit 1 includes the frame element 2E which cooperates with the housing second end of the housing 2 to define the hole portion 2ES therebetween and has a gripping assisting function of being gripped from the housing back face 2C side together with the housing 2 for operation of the portable terminal unit 1 by the user in such a manner as to project from a position of the housing second end of the housing 2 rather near to the housing back face 2C thereby to assist gripping of the housing 2 and a braid holding function of holding the braid 203 of the strap 200 threaded through the hole portion 2ES at the string holding groove 2EV thereof.

Accordingly, the portable terminal unit 1 can be gripped such that, when the housing 2 thereof is gripped from the housing back face 2C side by a hand of the user, the frame element 2E is positioned at a central portion of the palm of the hand and a portion of the housing 2 from the frame back face 2ET of the frame element 2E to the housing back face 2C is contacted with a portion of the hand from a central portion of the palm to the second joint portions of the forefinger and the middle finger such that the various operation keys arranged on the housing second end side of the housing principal face 2A may approach the root portions of the forefinger and the middle finger as much. As a result, although the length of the housing 2 itself is comparatively small along the housing lengthwise direction, the portion of the portable terminal unit 1 which contacts with the palm together with the frame element 2E can be increased comparatively. Thus, while the housing 2 is gripped stably from the housing back face 2C side, the user can operate the operation keys 4 to 8 easily without bending the thumb unnaturally.

The portable terminal unit 1 can be used in a state suspended from a hand, the neck or the like through the strap string 201 by fitting, when the braid 203 of the strap 200 is threaded between the housing second end of the housing 2 and the frame element 2E and fastened to the frame element 2E, the braid 203 into the string holding groove 2EV so as to be held by the string holding groove 2EV.

In summary, in the portable terminal unit 1, the display section 3 is arranged at a position of the housing principal face 2A of the housing 2 displaced to the housing first end side, and the operation keys 4 to 8 are arranged at a position of the housing principal face 2A of the housing 2 displaced to the housing second end side with respect to the display section arrangement position. Further, the frame element 2E is provided so as to project from the housing second end of the housing 2 and cooperate with the housing second end to define a hole portion 2ES therebetween. The frame element 2E has a gripping assisting function of being gripped together with the housing 2 when the housing 2 is gripped from the back face 2C side thereof for operation of the portable terminal unit 1 by the user thereby to assist gripping of the housing 1 and a strap holding function of holding the strap 200 threaded through the hole portion 2ES. Therefore, with the portable terminal unit 1, by providing the single frame element 2E on the housing 2, the user can operate the portable terminal unit 1 while the housing 2 is gripped stably from the housing back face 2C side together with the frame element 2E. Further, the portable terminal unit 1 can be suspended on and carried by a hand, the neck or the like of the user using the strap 200 whose braid 203 is held by the frame element 2E. Consequently, the portable terminal unit 1 can easily achieve enhancement of the operability and the portability with a simple configuration.

Further, in the portable terminal unit 1, the frame back face 2ET of the frame element 2E is formed as a continuous curved face which is curved toward the housing principal face 2A side. Accordingly, when the housing 2 of the portable terminal unit 1 is gripped from the housing back face 2C side together with the frame element 2E, the frame back face 2ET of the frame element 2E can contact with the palm of a hand of the user without giving an unfamiliar feeling to the user. Consequently, the housing 2 of the portable terminal unit 1 can be gripped further stably.

Further, in the portable terminal unit 1, the string holding groove 2EV is formed at a middle position of the surface of the edge of the back face side opening 2ESX on the central portion 2ER side of the frame element 2E, which is a position corresponding to an imaginary straight line which extends in the housing lengthwise direction from the housing first end toward the housing second end and passes the housing principal face 2A. Accordingly, in the portable terminal unit 1, the braid 203 to be bound to the frame element 2E can be held at the center of the frame element 2E. Consequently, the portable terminal unit 1 can be suspended stably from a hand, the neck or the like of the user through the strap 200.

Further, if the portable terminal unit 1 is suspended actually from a hand, the neck or the like of the user through the strap 200 while the braid 203 is held at the string holding groove 2EV of the frame element 2E, then the braid 203 is tightened by the self weight of the portable terminal unit 1. Therefore, while the braid 203 can be held in the string holding groove 2EV so that it may not be displaced from the middle portion of the frame element 2E toward the first end 2EP side or the second end 2EQ side, an angle is formed at a boundary portion of the string holding groove 2EV with respect to the surface of the edge of the back face side opening 2ESX. Accordingly, even if the portable terminal unit 1 is suspended from a hand, the neck or the like of the user through the strap 200 and is swung, the braid 203 can be held substantially with certainty in the string holding groove 2EV so that it may not be displaced from the middle position of the frame element 2E toward the first end 2EP side or the second end 2EQ side.

Further, in the portable terminal unit 1, the braid 203 of the strap 200 is held by the frame element 2E provided so as to project from the housing second end of the housing 2. Accordingly, when the portable terminal unit 1 is used in a state wherein it is suspended from a hand, the neck or the like of the user through the strap 200 and, upon operation thereof, the housing 2 is gripped from the housing back face 2C side together with the frame element 2E, the strap 200 can be laid toward the wrist side in the hand. Consequently, even where the strap 200 is attached to the portable terminal unit 1, it can be prevented from making an obstacle to an operation of the portable terminal unit 1.

It is to be noted that, while, in the embodiment described hereinabove, the string holding groove 2EV is formed at the middle position of the frame element 2E, according to the present embodiment, the location at which the string holding groove 2EV is to be formed is not limited to this. For example, the string holding groove 2EV may be provided at a predetermined position of the frame element 2E displaced from the middle position toward the first end 2EP or the second end 2EQ.

Further, while, in the embodiment described hereinabove, the string holding groove 2EV is formed on the surface of the edge of the back face side opening 2ESX of the frame element 2E, according to the present embodiment, the location of the string holding groove 2EV is not limited to this. In particular, the string holding groove 2EV may be provided on the surface of an edge of the principal face side opening 2ESY of the frame element 2E.

Further, while, in the embodiment described hereinabove, an angle is formed at a boundary portion of the string holding groove 2EV with respect to the surface of the edge of the back face side opening 2ESX, according to the present embodiment, the angle may not be formed at the boundary portion of the string holding groove 2EV with respect to the edge surface of the back face side opening 2ESX. For example, the string holding groove 2EV may be formed with a comparatively great depth or the inner surface of the string holding groove 2EV may be worked so as to have a comparatively high contact resistance so that the braid 203 may not be removed readily.

Further, while, in the embodiment described hereinabove, the single string holding groove 2EV is formed on the frame element 2E, according to the present embodiment, the number of such string holding grooves is not limited to this. In particular, two ore more string holding grooves 2EV may be formed on the frame element 2E. Or, for example, two braids 203 or the opposite ends of the strap string 201 may be held in different string holding grooves 2EV.

Further, while, in the embodiment described hereinabove, the braid 203 is held in the string holding groove 2EV of the frame element 2E, according to the present embodiment, the element to be held in the string holding groove 2EV of the frame element 2E is not limited to this, but the strap string 201 itself, a leather strap, a chain or the like may be held as the apparatus attachment string.

Further, while, in the embodiment described hereinabove, the string holding groove 2EV is formed at part of the frame element 2E, according to the present embodiment, the formation is not limited to this. For example, concave and convex portions for holding an apparatus attachment string may be formed at part of the surface of the frame element 2E or grooves or concave and convex portions for holding an apparatus attachment string may be formed at a predetermined position of the frame element 2E such that they extend over a circumference from the frame back face 2ET to the inner face of the hole portion 2ES.

Further, while, in the embodiment described hereinabove, the portable unit according to the present embodiment is applied to the portable terminal unit 1 described hereinabove with reference to FIGS. 1A to 37, according to the present embodiment, the application of the portable unit is not limited to this. In particular, the portable unit according to the present embodiment can be applied widely to various other portable units such as, for example, a portable semiconductor memory, a digital camera, a portable radio unit, a portable image reproduction apparatus, a portable game machine, a PDA (Personal Digital Assistance) and a portable telephone set only if a strap is attached.

Further, while, in the embodiment described hereinabove, the braid 203 of the strap 200 described hereinabove with reference to FIGS. 1A to 37 is applied as the apparatus attachment string, according to the present embodiment, the apparatus attachment string is not limited to this. In particular, various other string-like elements such as, for example, a strap string and a leather string, a chain made of metal or resin and a rubber string can be applied widely to the apparatus attachment string only if they can be attached as at least part of a strap to a portable unit.

Further, while, in the embodiment described hereinabove, the display control section 27 described hereinabove with reference to FIGS. 1A to 37 is applied as a control section for controlling display of the display section, according to the present embodiment, the control section is not limited to this, but various other control sections such as a central processing unit (CPU) can be applied widely.

Furthermore, while, in the embodiment described hereinabove, the various circuits described hereinabove with reference to FIG. 2 are provided in the portable terminal unit 1, according to the present embodiment, the configuration of the portable terminal unit 1 is not limited to this. In particular, the processes of the portable terminal unit 1 described hereinabove may otherwise be implemented by software processes by a central processing unit.

The present invention can be applied to a portable unit to which a strap is attached such as a portable music reproduction apparatus, a portable semiconductor memory or a portable telephone set.

While a preferred embodiment of the present invention has been described using specific terms, such description is for illustrative purposes only, and it is to be understood that changes and variations may be made without departing from the spirit or scope of the following claims.

What is claimed is:
1. A portable unit, comprising:
a housing;
a display section arranged at a position of a principal face of said housing disposed at a housing first end side;

an operation key arranged at a position of the principal face of said housing disposed at a housing second end side with respect to the display section; and a frame element defined by a principal surface and a back surface, the frame element projecting from the housing second end side and having an aperture therein, wherein the principal surface extends along a first plane that is substantially parallel to a second plane corresponding to the principal face of the housing, and a portion of the back surface is flush with a back face of the housing, the back surface extending in a direction towards the principal surface, wherein said frame element has a gripping assisting function of being gripped with said housing when said housing is gripped from the back face of said housing for operation of said portable unit by a user, and wherein the frame element includes a strap holding function of holding a strap threaded through said aperture.

2. The portable unit according to claim 1, wherein said frame element has a groove formed on the back surface of the frame element, the groove configured to hold the strap as the strap holding function.

3. The portable unit according to claim 2, wherein said frame element is formed in a symmetrical shape with respect to a third plane that is perpendicular to the principal face of the housing and which extends from the housing first end side toward the housing second end side, and said groove is formed at a middle portion of the surface of said frame element on an aperture side which is centered on the third plane.

4. The portable unit according to claim 1, wherein said frame element has a first end and a second end on said housing second end side and a middle portion spaced away from the housing second end side and is formed such that a thickness of the frame element gradually decreases from the first and second ends toward the middle portion.

5. The portable unit according to claim 1, further comprising a control section configured to control display of said display section, and wherein said display section displays a plurality of items for operating said portable unit in a list in which the plurality of items are juxtaposed in a particular direction from the housing first end toward the housing second end, and said control section controls the display of said display section such that an indicator for selecting one of the items is moved in the particular direction in response to an operation of said operation key.

6. The portable unit according to claim 5, wherein said control section controls the display of said display section such that the items displayed in the list are scrolled along the particular direction in response to an operation of said operation key.

7. The portable unit according to claim 2, wherein the groove extends longitudinally on the frame element from an inner wall of the frame element to the back surface, the inner wall opposing the housing second end side.

8. The portable unit according to claim 1, wherein a curvature of the back surface of the frame element approximates a curvature of a palm of a user's hand.

9. The portable unit according to claim 1, wherein the aperture includes an inner portion defined by a first wall corresponding to the housing second end side and a second wall corresponding to the frame element, a first segment of the first wall being substantially parallel to a first segment of the second wall, and second segments of the first and second walls diverging such that the aperture is larger at the principal surface than at the back surface.

10. The portable unit according to claim 1, wherein a width of the aperture continuously decreases from the principal surface to a middle section and remains substantially constant thereafter to the back surface.

11. The portable unit according to claim 1, wherein the principal and back surfaces of the frame element are joined by an intersecting wall.

* * * * *